United States Patent
Cywar et al.

(10) Patent No.: US 10,066,124 B2
(45) Date of Patent: Sep. 4, 2018

(54) METHOD OF REDUCING SCALE IN THE BAYER PROCESS

(71) Applicant: Cytec Industries Inc., Woodland Park, NJ (US)

(72) Inventors: Douglas A Cywar, Danbury, CT (US); Chester J Calbick, Weston, CT (US); Frank Kula, Danbury, CT (US); Dannon Stigers, Milford, CT (US); Matthew Taylor, New York, NY (US)

(73) Assignee: Cytec Industrial Inc., Woodland Park, NJ (US)

( * ) Notice: Subject to any disclaimer, the term of this patent is extended or adjusted under 35 U.S.C. 154(b) by 56 days.

(21) Appl. No.: 14/578,965

(22) Filed: Dec. 22, 2014

(65) Prior Publication Data

US 2015/0175844 A1 Jun. 25, 2015

Related U.S. Application Data

(60) Provisional application No. 61/920,542, filed on Dec. 24, 2013, provisional application No. 62/066,615, filed on Oct. 21, 2014.

(51) Int. Cl.

| | |
|---|---|
| *C09D 183/14* | (2006.01) |
| *C09D 183/00* | (2006.01) |
| *C09D 133/02* | (2006.01) |
| *C01F 7/06* | (2006.01) |
| *C23F 14/02* | (2006.01) |
| *C02F 5/10* | (2006.01) |
| *C02F 5/12* | (2006.01) |
| *C02F 103/16* | (2006.01) |

(52) U.S. Cl.
CPC .......... *C09D 183/14* (2013.01); *C01F 7/062* (2013.01); *C01F 7/064* (2013.01); *C02F 5/10* (2013.01); *C09D 133/02* (2013.01); *C09D 183/00* (2013.01); *C23F 14/02* (2013.01); *C02F 5/12* (2013.01); *C02F 2103/16* (2013.01)

(58) Field of Classification Search
CPC .. C09D 133/02; C09D 183/00; C09D 183/14; C01F 7/062; C02F 5/10; C23F 14/02
USPC .......................................................... 524/806
See application file for complete search history.

(56) References Cited

U.S. PATENT DOCUMENTS

| | | |
|---|---|---|
| 4,731,259 A | 3/1988 | Lloyd |
| 5,314,626 A | 5/1994 | Dimas |
| 5,415,782 A | 5/1995 | Dimas |
| 7,999,065 B2 | 8/2011 | Heitner et al. |
| 8,029,752 B2 | 10/2011 | La et al. |
| 8,067,507 B2 | 11/2011 | Spitzer et al. |
| 8,282,834 B2 | 10/2012 | Cui |
| 2004/0011744 A1* | 1/2004 | Spitzer .................. C01F 7/0606 210/698 |
| 2009/0099328 A1 | 4/2009 | Heitner et al. |
| 2011/0076209 A1 | 3/2011 | La et al. |
| 2011/0077185 A1 | 3/2011 | Cui |
| 2011/0212006 A1 | 9/2011 | La et al. |
| 2011/0220581 A1 | 9/2011 | Heitner et al. |
| 2012/0148462 A1 | 6/2012 | Phillips et al. |
| 2013/0032763 A1 | 2/2013 | Cui |
| 2013/0189529 A1 | 7/2013 | Kildea et al. |

FOREIGN PATENT DOCUMENTS

| | | |
|---|---|---|
| WO | 2005095477 A2 | 10/2005 |
| WO | 2008045677 A1 | 4/2008 |
| WO | 2004009606 A1 | 1/2009 |
| WO | 2006086189 A1 | 8/2009 |
| WO | 2013126683 A1 | 8/2013 |

OTHER PUBLICATIONS

V.G. Kazakov et al., Tsvetnye Metally/Non-Ferrous Metals; Intensifying the Vaporization of Soda-Alkaline Aluminate Solutions (1979) pp. 43-44.
V.G. Kazakov et al., Tsvetnye Metally/Non-Ferrous Metals; Heating and Evaporation of Silicone-Containing Aluminate Solutions (1979) pp. 45-48.
Spitzer et al., MAX HT Sodalite Scale Inhibitor: Plant Experience and Impact on the Process; Light Metals 2008, 2008.

* cited by examiner

*Primary Examiner* — Edward J Cain
(74) *Attorney, Agent, or Firm* — Jericho B. Pacho

(57) ABSTRACT

Methods for reducing aluminosilicate containing scale in a Bayer process involving treating a Bayer process equipment surface with a scale inhibiting composition having high ionic strength prior to exposure to a Bayer process stream.

16 Claims, No Drawings

METHOD OF REDUCING SCALE IN THE BAYER PROCESS

BACKGROUND OF THE INVENTION

Field of the Invention

This invention relates to methods of preventing or reducing aluminosilicate containing scale in an alumina recovery process stream.

Description of the Related Art

There are two processes for recovering alumina from raw bauxite ore, or bauxite; namely, the Bayer process and the sinter process. This includes blends of those two processes, as well as modifications of each process.

The Bayer process is an industrial process used to manufacture alumina from raw bauxite ore, or bauxite. Bauxite is principally composed of aluminum oxide ($Al_2O_3$), commonly referred to as alumina, as well as iron oxide and other impurities, commonly known as "red mud" due to the red color caused by the iron oxide. These additional impurities present in minor amounts in raw bauxite ore include silica, aluminosilicate minerals and organic materials.

In the Bayer process, milled raw bauxite ore is first heated or digested with a highly caustic solution referred to as the digestion liquor. Digestion liquor generally includes a caustic solution of sodium hydroxide (NaOH) together with spent liquor recycled from the alumina precipitation process. This dissolution process is undertaken at high temperatures in order to fully dissolve all aluminum-bearing minerals, especially alumina trihydrate (gibbsite) and alumina monohydrate (boehmite and/or diaspore), yielding a supersaturated solution of sodium aluminate ($Al(OH)_4^- + Na^+$) or "pregnant liquor". Red mud iron oxides remain undissolved in this digestion liquor and must be removed prior to isolation of the purified alumina.

As mentioned above, bauxite ores used in the Bayer process also contain impurity minerals comprising silica in various forms and amounts, depending on the source of the bauxite. The caustic solution used to dissolve the aluminum minerals also dissolves part or all of the silica content of the bauxite, especially silica present in the form of aluminosilicate clays. The resulting concentrations of dissolved salts in the digestion liquor are very high, with sodium hydroxide concentrations typically being 150 grams/liter ('g/l') or greater, and dissolved alumina typically being 120 g/l or greater. Some of the silicate minerals rapidly dissolve in the digestion step to form solutions that are supersaturated with silica. At least part of this dissolved silica then reacts with the sodium aluminate ($Al(OH)_4^-$) present in solution to form insoluble complex hydrated sodium aluminum silicates, generally designated as desilication products or "DSP".

This complex insoluble hydrated sodium aluminum silicates or DSP formed in the digestion process must be removed from the digestion liquor along with the red mud solids prior to isolation of the purified alumina product in the precipitation and calcination steps. Removal of red mud from the digestion or pregnant liquor is generally achieved by one or more solid-liquid separation steps involving sedimentation and/or filtration or other solids/liquid separation techniques, most often with the aid of a flocculant. Often, substantially all of the solids are removed from the digestion liquor; however, in some cases minor amounts of solids may not be separated from the liquor. Some of the silica that remains dissolved in the pregnant liquor can, at a later point in the process after removal of the solids, combine with aluminate ions to form insoluble complex aluminosilicate minerals such as sodalite or cancranite, which then have a tendency to precipitate out on the surfaces of Bayer process equipment as mineral scale.

After separation or filtration, the clarified pregnant liquor is then cooled and seeded with alumina trihydrate to precipitate a portion of the dissolved alumina in the form of alumina trihydrate ($Al(OH)_3$), which is then isolated by sedimentation and/or filtration before being calcined. After the alumina precipitation step, the remaining low solids solution (also called "spent liquor") is reheated and recycled to the digestion step. This process of heating low solids spent liquor prior to its addition to the bauxite ore in the digestion step is referred to in the industry as a "double stream process". As the spent liquor still contains dissolved aluminate and silicate anions, further processing of this liquor, especially heating, often causes deposition of aluminosilicate scales on the surface of Bayer process equipment such as heat exchangers. This scaling process poses a significant problem for the industry in that it can foul equipment and affect process efficiency.

In plants that operate a "single stream process", fresh bauxite is mixed with the spent liquor before going through the heat exchangers on the way to digestion. As such, in single stream processes the liquor that is exposed to heat exchanger surfaces also contains red mud solids originating from the freshly charged bauxite. Thus, in single stream processes, the Bayer process stream that is prone to scaling is now contaminated with significant amounts of undissolved red mud solids (i.e., a significantly higher solids content), which markedly reduces the efficacy of prior art scale inhibition processes, such as the double stream process describe above. The amounts of undissolved red mud solids present in the heat exchanger liquor in a single stream plant can be as much as 30-150 g/l or more, versus 10 mg/l or less in a low solids double stream process. Thus, there is also a need for improved methods of inhibiting scale formation on the surface of Bayer process equipment in single stream plants.

In heat exchangers used to reheat spent liquor, the high temperatures increase the rate of aluminosilicate precipitation. As a result, aluminosilicates form as scale on the inside walls of the heat exchangers and other associated process equipment. The scale is usually in the form of sodalite or cancrinite, but other aluminosilicate scales can form. This scale has low thermal conductivity compared to that of the steel walls, resulting in heat transfer being severely reduced as scale builds up. The reduction in heat transfer caused by aluminosilicate scaling can be so severe that the heat exchange units have to be taken out of service and cleaned frequently, as often as every one to two weeks. In addition to the obvious cost of maintenance and labor required to clean the scale from the heat exchangers, the impact of scale on the equipment can also be seen in increased energy consumption, reduced liquor flows, reduced throughput, reduced evaporation and even reduced production.

As described above, in a double stream process spent liquor is reheated in heat exchangers before it is contacted with fresh bauxite. Therefore, spent liquor in a double stream plant ordinarily does not contain large quantities (e.g., >10 mg/l) of insoluble solids such as red mud solids which may adversely affect the performance of scale inhibitors. However, in single stream plants (as well as some double stream plants, especially those that employ sand filters), red mud solids can be great enough (e.g., as much as 50-150 mg/l) to adversely affect scale inhibitor performance.

Thus, there is also a need for improved methods of inhibiting scale formation on the surface of Bayer process equipment in double stream plants where the spent liquors contain undissolved solids, particularly higher concentrations of undissolved solids.

The sinter process is an alternative or adjuvant to the Bayer process, and is commonly used for the treatment of high silica-containing bauxites. In the sinter process, the bauxite (or "red mud") is calcined at 1200° C. with soda and/or lime prior to leaching with NaOH solution, generating sodium aluminate liquor (also commonly referred to as "supersaturated green liquor") and insoluble "sinter mud".

Bulk dosing (in situ) methods of applying scale inhibitors containing —Si(OR)$_n$ groups in the Bayer process, wherein n=1, 2 or 3 is known in the art. Such in situ methods include dosing "small molecule" scale inhibitors containing —Si(OR)$_n$ groups in the Bayer process.

In addition to dosing scale inhibitors containing —Si(OR)$_n$ groups, other techniques have included direct addition (bulk dosing) of methyl and ethyl siliconates to Bayer liquor, as well as well as a variety of other compounds such as ammonium, aromatic amine, amine compounds, polymeric quaternary ammonium compounds, polyamine polymers, copolymers of acrylic acid and acrylamide, and polyacrylamides. Bulk dosing of silica particles and dosing of water-soluble polymers with carboxylic acid groups in Bayer liquor is also known.

Besides bulk dosing, other methods for reduction of aluminosilicate scale in the Bayer process include a process of contacting at least a portion of at least one surface of at least one piece of Bayer process equipment with a scale inhibiting composition of matter in the absence of any liquor, wherein the scale inhibitor is a "small molecule" scale inhibitor containing —Si(OR)$_n$ groups.

Another process teaches pretreatment of surfaces of Bayer process equipment with thermosetting epoxy/urethane resins to inhibit scale formation. This coating process involves a curing reaction that is both laborious and time-consuming, and further requires use of a thick layer resin which could compromise heat transfer.

Regarding single stream processes, the publication Spitzer et al., *MAX HT Sodalite scale inhibitor: Plant experience and impact on the process*, LIGHT METALS (2008), pp. 57-62 describes the problem of ineffectiveness of scale inhibition in single streaming plants.

None of these prior art processes fully solve the problems of treating Bayer process streams economically. Further, the literature does not address the problem of scaling in single stream processes. Thus, there is a need for improved methods of reducing or eliminating scale in the Bayer process.

SUMMARY OF THE INVENTION

The present invention provides a method for reducing aluminosilicate containing scale in a Bayer process. This method includes identifying a Bayer process equipment surface that is subject to scale formation during the Bayer process. The surface of this process equipment is then contacted with a scale inhibiting composition in an amount effective to form a treated surface that is more resistant to scale formation upon subsequent contact with a Bayer process stream than an otherwise comparable untreated surface. The pretreated surface of the equipment is then contacted with the Bayer process stream.

In contrast to prior art "in situ" methods of controlling scale, it has now been found that, in order to control scale formation of the surface of process equipment, it is not necessary to add a silicon-containing compound having one or more —Si(OR)$_n$ groups to the Bayer process stream if the surface of the steel equipment is first pretreated with a solution of the silicon-containing compound in a liquor having specific characteristics before being exposed to the Bayer process stream. Surprisingly, the liquor composition plays a significant role in controlling scale formation. It has also now been found that the liquor must contain a minimum level of dissolved salts in order for scale to be inhibited.

The scale inhibiting composition comprises a liquor comprising an aqueous solution of one or more water-soluble salts containing at least about 0.004% of total dissolved salts (TDS) or a liquor having a pH of about 11.0 or greater. The liquor further comprises a silicon-containing compound having one or more —Si(OR)$_n$ groups, wherein n is an integer from 1 to 3. R can be H, optionally substituted $C_1$-$C_{20}$ alkyl, optionally substituted $C_6$-$C_{12}$ aryl, optionally substituted $C_7$-$C_{20}$ aralkyl, optionally substituted $C_2$-$C_{20}$ alkenyl, Group I metal ion, Group II metal ion, or $NR^1_4$; wherein each $R^1$ is independently chosen from H, optionally substituted $C_1$-$C_{20}$ alkyl, optionally substituted $C_6$-$C_{12}$ aryl, optionally substituted $C_7$-$C_{20}$ aralkyl, and optionally substituted $C_2$-$C_{20}$ alkenyl.

The aqueous solution of one or more water-soluble salts preferably contains enough total dissolved solids ('TDS') to increase the ionic strength of the scale inhibiting composition. The aqueous solution can contain about 0.004% or more, preferably about 0.1% or more, more preferably at least about 1.0%, even more preferably at least about 2.0%, even more preferably at least about 5.0%, and most preferably at least about 10.0% by weight of total dissolved salts ('TDS').

Another aspect of this disclosure relates to a method for reducing aluminosilicate containing scale in a Bayer process that includes identifying a Bayer process equipment surface that is subject to scale formation during the Bayer process, wherein the identified Bayer process equipment surface is contacted with a scale inhibiting composition as described above in an amount effective to form a treated surface that is more resistant to scale formation upon subsequent contact with a Bayer process stream than an otherwise comparable untreated surface, and then contacting the surface with the Bayer process stream, wherein suspended solids in the Bayer process stream can be present in an amount of about 0.01% to about 60% by weight, based on total weight of the Bayer process stream.

These and other embodiments are described in greater detail below.

DETAILED DESCRIPTION OF THE INVENTION

The term "Bayer process liquor" and similar terms are used herein in a manner consistent with their ordinary meaning as understood by those skilled in the art of the Bayer process. Thus, Bayer process liquor refers to various alumina-containing solutions present in the Bayer process.

The term "Bayer process stream" and similar terms are used herein in a manner consistent with their ordinary meaning as understood by those skilled in the art of the Bayer process. Thus, Bayer process stream refers to a process stream from which alumina is produced.

The term "spent Bayer process liquor" or "spent liquor" and similar terms are used herein in a manner consistent with their ordinary meaning as understood by those skilled in the art and thus include Bayer process liquor streams remaining after the soluble alumina has been partially or wholly precipitated as solid alumina trihydrate from the liquor. After dissolution of the alumina from the bauxite and removal of insoluble waste material from the process stream, the soluble alumina is precipitated as solid alumina trihydrate, and the remaining caustic solution or spent liquor is then typically recycled back to earlier stages in the process and used to treat fresh bauxite. Spent liquor often has a low ratio of alumina concentration to caustic in the liquor.

The term "pregnant Bayer process liquor" and similar terms are used herein in a manner consistent with their ordinary meaning as understood by those skilled in the art and thus include Bayer process liquor after digestion and prior to precipitation. Pregnant liquor typically has a high ratio of alumina concentration to caustic concentration in the liquor.

The term "evaporated Bayer process liquor" and similar terms are used herein in a manner consistent with their ordinary meaning as understood by those skilled in the art and thus include spent liquor that has been evaporated to a higher caustic concentration.

The term "Synthetic Bayer Liquor" or SBL refers to a liquid used for laboratory experimentation having a composition with respect to alumina, soda, and caustic that is representative of Bayer process liquor.

The term "liquor" as used herein refers to an aqueous solution of one or more water-soluble salts containing at least 0.004% by weight of total dissolved salts (TDS). The aqueous solution can have a pH of about 11.0 or above with or without any level of salt present.

"Amine" as used herein refers to a molecule containing one or more nitrogen atoms and having at least one secondary amine or primary amine group. Amines include monoamines such as methyl amine, ethylamine, octylamine, dodecylamine, and polyamines, defined herein below.

The term "polyamine" and similar terms are used herein in a manner consistent with their ordinary meaning as understood by those skilled in the art and thus include compounds having at least two amine units. The term includes simple diamines, triamines, tetramines, pentamines and hexamines, as well as molecules with higher molecular weight such as polyethyleneimine, which can have a molecular weight of many thousands or tens of thousands or even higher. For example, a polyamine can include a unit of the formula —$(CH_2)_r$—$NR^a$—, where r is an integer in the range of 1 to about 20 and each $R^a$ is independently H, optionally substituted $C_1$-$C_{20}$ alkyl, optionally substituted $C_6$-$C_{12}$ aryl, optionally substituted $C_7$-$C_{20}$ aralkyl, or optionally substituted $C_2$-$C_{20}$ alkenyl. The polyamine can comprise a $(NR^b_2)$-$J^a$-$(NR^b_2)$ moiety, wherein $J^a$ is an optionally substituted hydrocarbyl fragment having from about 2 to about 40 carbons; and each $R^b$ is independently H, optionally substituted $C_{1-8}$ alkyl, or optionally substituted $C_{6-10}$ aryl. In one embodiment, the hydrocarbyl fragment $J^a$ is optionally substituted $C_2$-$C_{20}$ alkyl, optionally substituted $C_2$-$C_{20}$ alkenyl group or optionally substituted $C_6$-$C_{20}$ aryl. In one embodiment, the polyamine is a $C_6$-$C_{20}$ aliphatic diamine. Examples of other suitable polyamines include polyethyleneimine, triethylenetetramine, tetraethylenepentamine, pentaethylenehexamine, 1,2-diaminoethane, 1,3-diaminopropane, diaminobutanes such as 1,4-diaminobutane, diaminopentanes such as 1,5-diaminopentane, diaminohexanes such as 1,5-diaminohexane, 2-methyl-4,4-dimethyl-1,6-hexanediamine, 2,2,4-trimethyl-1,6-hexanediamine, 1,8-diaminooctane, diaminoisophorone aminoaniline, and aminomethylbenzylamine, and reaction products of monoamines (e.g., ammonia, methylamine or dimethylamine) with epichlorohydrin, bisepoxides or ethylene dichloride.

The term "polymer" and similar terms are used herein in a manner consistent with their ordinary meaning as understood by those skilled in the art and thus include chemical compounds formed by combining small molecules known as monomers into a covalently bonded chain or network. These polymers may contain recurring structural units each containing two or more atoms. Many polymers have high molecular weights of about 500 or greater, while some polymers can have molecular weights of less than 500. Molecular weights are weight average molecular weights as determined by high pressure size exclusion chromatography (also referred to as gel permeation chromatography) using light scattering detection, unless otherwise indicated. The term "polymer" includes oligomers, copolymers and homopolymers.

The terms "hydrocarbon" and "hydrocarbyl" are broad terms that are used herein in their ordinary sense as understood by those skilled in the art, and thus include organic compounds or radicals consisting exclusively of the elements carbon and hydrogen. These moieties include alkyl, alkylene, alkenyl, alkynyl, and aryl moieties. These moieties also include alkyl, alkenyl, alkynyl, and aryl moieties substituted with other aliphatic or cyclic hydrocarbon groups, such as alkaryl, alkenaryl and alkynaryl. Unless otherwise indicated, these moieties preferably have 1 to 40 carbon atoms. Hydrocarbyl radicals may be substituted with various groups that do not consist exclusively of the elements carbon and hydrogen, and thus a substituted hydrocarbyl radical may contain one or more heteroatoms such as oxygen and/or nitrogen.

The term "substituted", whether preceded by the term "optionally" or not, is a broad term that is used herein in its ordinary sense as understood by those skilled in the art. "Substituted" thus includes replacement of one or more hydrogen radicals in a given structure with one or more substituent groups, which may be any permissible organic substituents of the given structure. Examples of substituents that may be permissible for a given structure include hydroxy; $C_{1-10}$ alkyl; $C_{1-10}$ alkenyl; allyl; halogen; $C_{1-10}$ haloalkyl; $C_{1-10}$ alkoxy; hydroxy $C_{1-10}$ alkyl; carboxy; $C_{1-10}$ carboalkoxy (also referred to as alkoxycarbonyl); $C_{1-10}$ carboxyalkoxy; $C_{1-10}$ carboxamido (also referred to as alkylaminocarbonyl); cyano; formyl; $C_{1-10}$ acyl; nitro; amino; $C_{1-10}$ alkylamino; $C_{1-10}$ dialkylamino; anilino; mercapto; $C_{1-10}$ alkylthio; sulfoxide; sulfone; $C_{1-10}$ acylamino; amidino; phenyl; benzyl; heteroaryl; heterocycle; phenoxy; benzoyl; benzoyl substituted with amino, hydroxy, methoxy, methyl or halo; benzyloxy and heteroaryloxy. When the substituted group contains an alkyl segment, two hydrogen atoms on the same carbon atom may be replaced by a single substituent double bonded to the carbon atom (e.g., oxo (=O)).

"Alkylamine" means a group where hydrogen atoms of ammonia are substituted with alkyl groups.

The term "reaction product" is used herein to mean the composition resulting from the reaction of two or more reactants.

The terms "alkyloxy" and "alkoxy" as used herein refer to the structure of $OX^a$ where $X^a$ is a hydrocarbon and O is oxygen. "Monoalkyloxy" means that attached to a silicon atom is one alkyloxy group. "Dialkyloxy" means that attached to a silicon atom are two alkyloxy groups. "Trialkyloxy" means that attached to a silicon atom are three alkyloxy groups.

"Alkylene" means an unsaturated, aliphatic hydrocarbon with one or more carbon-carbon double bonds.

Methods of Reducing Aluminosilicate Containing Scale

It now has been discovered that by treating the surface of a piece of Bayer process equipment with a scale inhibiting composition before that surface is contacted with a Bayer process stream, scale inhibition can be achieved at more economical dosages. Although this method of scale inhibition can be used in conjunction with other known methods, unlike other methods that involve directly adding or dosing scale inhibiting agents into the Bayer process stream (i.e., the "in situ" methods), the minimum dose of scale inhibitor required to prevent scale from forming on the surfaces of process equipment in the present method is significantly reduced. This method of treating the equipment surface with scale inhibiting composition prior to exposure to or contact with a Bayer process stream is particularly useful in single stream plants where the liquor contains high levels of suspended red mud solids prior to running through the heat exchanger, as well as in double stream plants where the Bayer process stream can be a Bayer liquor contaminated with solids such as red mud solids.

The method for reducing aluminosilicate containing scale in a Bayer process can include identifying or selecting a Bayer process equipment surface that is subject to scale formation during the Bayer process. The selected Bayer process equipment surface is then contacted with a scale inhibiting composition in an amount that is effective to form a treated surface that is more resistant to scale formation upon subsequent contact with a Bayer process stream than an otherwise comparable untreated surface. The treated surface is subsequently contacted with the Bayer process stream.

In processes according to the present invention, the Bayer process stream can include an amount of a suspended solid in the range of about 0.01% to about 60% by weight, based on total weight of the Bayer process stream.

Various parts of the Bayer process equipment surface can be subjected to scale formation. For example, scale can form in the surface of interconnecting pipes, vessels, heat exchangers, valves, pumps and other equipment used in a Bayer process. The surface can be made of various materials. In some embodiments, the surface can be stainless steel. In other embodiments, the surface can be carbon steel.

Contacting the identified surface of the Bayer process equipment with the scale inhibiting composition can be performed using various methods. In some embodiments, the scale inhibiting composition can flow through and contact the identified Bayer process surface with agitation. In other embodiments, the contacting methods can include recirculating the scale inhibiting composition through the Bayer process equipment. Other methods of contacting the surface include but are not limited to brushing, soaking, and/or immersing the identified surface with the specific scale inhibiting composition.

When the Bayer process equipment surface is contacted with the scale inhibiting composition, some agitation or flow of the scale inhibiting composition can be applied during the treating period.

The Bayer process equipment surface can be treated with the scale inhibiting composition one or more times prior to exposure to the Bayer process stream. For example, the scale inhibiting composition can contact the Bayer process equipment surface one or more times, or the Bayer process equipment surface can be brushed with the scale inhibiting composition one or more times.

When a scale inhibiting composition is used to treat the Bayer process equipment surface, treating time can range from about 1 minute to about 24 hours. In some embodiments, treating time can range from about 4 hours to about 6 hours. In some embodiments, treating time can range from about 0.5 hour to about 4 hours.

Treating the identified surface of the Bayer process equipment with a scale inhibiting composition can be performed at different temperatures depending on the type and amount of scale inhibiting composition, structure of the silicon-containing compound, and treating time. In some embodiments, the treating step can be performed at room temperature; in others, at an elevated temperature. In some embodiments, the treating step can be performed at a temperature of from about 20° C. to about 200° C. In some embodiments, the treating step can be performed at a temperature of from about 50° C. to about 150° C. In some embodiments, the treating step can be performed at a temperature of from about 70° C. to about 125° C. In some embodiments, the treating step can be performed at a temperature of from about 90° C. to about 105° C. In some embodiments, the treating step can be performed at about 100° C. or less. Those skilled in the art recognize that, depending on the boiling point of the scale inhibiting composition, treating temperatures above about 100° C. generally involve pressurizing the Bayer process equipment (e.g., as illustrated in the examples below). The treated surface can then be contacted with the Bayer process stream with or without rinsing and/or drying.

The Bayer process equipment surface can be cleaned before being exposed to the scale inhibiting composition. In some embodiments, the Bayer process equipment surface can be scrubbed, brushed or acid-cleaned to remove any mineral scale that may have been previously deposited on the surface before being exposed to the scale inhibiting composition.

Scale Inhibiting Composition

Various scale inhibiting compositions as described herein can be used for pretreating alumina recovery process equipment. For example, in one embodiment, the scale inhibiting composition can comprise a liquor having an aqueous solution of one or more water-soluble salts and a silicon-containing compound having one or more $-Si(OR)_n$ groups; wherein n is an integer in the range of 1 to 3. In some embodiments, n is 3. R is H, optionally substituted $C_1$-$C_{20}$ alkyl, optionally substituted $C_6$-$C_{12}$ aryl, optionally substituted $C_7$-$C_{20}$ aralkyl, optionally substituted $C_2$-$C_{20}$ alkenyl, Group I metal ion, Group II metal ion, or $NR^1_4$; wherein each $R^1$ is independently chosen from H, optionally substituted $C_1$-$C_{20}$ alkyl, optionally substituted $C_6$-$C_{12}$ aryl, optionally substituted $C_7$-$C_{20}$ aralkyl, and optionally substituted $C_2$-$C_{20}$ alkenyl.

The aqueous solution of water-soluble salts preferably contains enough total dissolved solids (TDS) to increase the ionic strength of the scale inhibiting composition. The aqueous solution of water-soluble salts preferably contains at least about 0.004%, more preferably at least about 0.01%, more preferably at least about 0.1%, more preferably at least about 1.0%, more preferably at least about 2.0%, even more preferably at least about 5.0%, and most preferably at least about 10.0% by weight of total dissolved salts.

In some embodiments, the aqueous solution of one or more water-soluble salts can be Bayer process liquor. When the aqueous solution of one or more water-soluble salts is Bayer process liquor, in some embodiments the liquor is spent Bayer process liquor. In other embodiments, the liquor is evaporated Bayer process liquor. In other embodiments, the liquor is pregnant Bayer process liquor.

Dissolved salts are salts of mineral and organic acids and basic compounds. The salts have enough solubility in water so as to increase the ionic strength of the aqueous solution. The salts can include one or more cations and one or more anions. Examples of suitable cations include lithium, sodium, potassium, magnesium, calcium and aluminium. Sodium is preferred. Examples of anions include fluoride, chloride, bromide, acetate, aluminate, silicate, sulfate, nitrate, phosphate, borate, bromate, carbonate, chlorate, hydroxide and bicarbonate. Preferred salts contain ions commonly found in Bayer process liquors, such as sodium, calcium, hydroxide, aluminate, sulfate and carbonate.

The concentration of water-soluble salts or the ionic strength of the aqueous solution can vary depending on the type of scale inhibiting composition, the structure of the silicon containing compound used, and the Bayer process stream, but is generally greater than that of pure or deionized water.

The pH of the aqueous solution can vary depending on the ions in the solution and the structure of the silicon containing compound used in the scale inhibiting composition. In some embodiments, the pH of the aqueous solution can range from about 3 to about 14 or more. In some embodiments, the pH of the aqueous solution can range from about 4 to about 14. In some embodiments, the pH of the aqueous solution can range from about 5 to about 14. In some embodiments, the pH of the aqueous solution can range from about 12 to about 14. In some embodiments, the pH of the aqueous solution can be about 7 or higher with some salt present. In some embodiments in the absence of salt, the pH of the aqueous solution can be about 11 or higher. In some embodiments, the pH of the aqueous solution can be about 12 or higher in the absence of salt. In some embodiments, the pH of the aqueous solution can be that of Bayer process liquor (i.e., about 13.5 or higher).

Further, in some embodiments of the invention, no additional salts—over and above those necessary to adjust the pH—are required to be present in the treatment liquor. For example, aqueous NaOH can be used as the treatment liquor without addition of other, different salts. When no additional salts are present, the pH is preferably about 10.5 or greater, more preferably about 11.0 or greater. When additional salts are present, the pH can be optimized within a broader range for beneficial results. When additional salts are present, alkaline pH's of those greater than about 7 are preferred.

Silicon-Containing Compound

Various silicon-containing compounds having one or more $—Si(OR)_n$ groups (wherein n is an integer from 1 to 3) can be used in the methods described herein. For example, silicon containing compounds used in scale inhibiting compositions described herein include those described in U.S. Patent Application Publication Nos. 2011/0076209, 2012/0148462, 2011/0212006, 2013/0189529, 2009/0099328, 2011/0220581, 2011/077185 and 2013/032763, International Patent Application Publication Nos. WO 2013/126683, WO 2004009606, WO 2006086189 and WO 2008045677, and/or U.S. Pat. No. 7,999,065.

The amount of silicon-containing compound in the scale inhibiting composition can vary depending on the type of silicon-containing compound used, the ionic strength and/or pH of the solution in the scale inhibiting composition, and/or the ratio of volume of scale inhibiting composition to the surface area of Bayer process equipment. In some embodiments, the amount of silicon-containing compound in the scale inhibiting composition is in a range of from about 10 milligrams/liter (mg/l) to about 2000 mg/l with a preferred range of about 250-1000 mg/l. In some embodiments, the amount of silicon-containing compound in the scale inhibiting composition is in a range of about 0.01% to about 25% by weight, based on total weight of the scale inhibiting composition. More preferably, the amount of silicon-containing compound in the scale inhibiting composition is in a range of about 0.01% to about 0.25% by weight, based on total weight of the scale inhibiting composition. Even more preferably, the amount of silicon-containing compound in the scale inhibiting composition is in a range of about 0.01% to about 0.1% by weight, based on total weight of the scale inhibiting composition Various forms of silicon-containing compounds can be used in the scale inhibiting composition. In some embodiments, the silicon-containing compound can be a polymer or a polymeric reaction product. The scale inhibiting composition can include a mixture of various silicon-containing compounds, and the silicon-containing compounds can contain a mixture of silicon-containing groups. For example, those skilled in the art will understand that a polymer or polymeric reaction product described herein as containing a particular Si-containing unit can be a copolymer and thus can contain other units, including other Si-containing unit(s).

In one embodiment, the silicon-containing compound can be a polymer or polymeric reaction containing a unit of Formula I and a unit of Formula II:

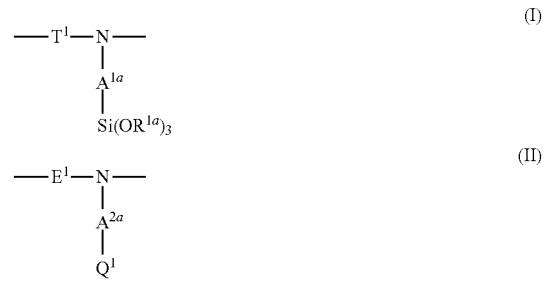

wherein $T^1$ and $E^1$ are each independently a first optionally substituted hydrocarbyl radical containing from about 2 to about 40 carbons; $Q^1$ is a H or second optionally substituted hydrocarbyl radical containing from about 1 to about 20 carbons; $A^{1a}$ and $A^{2a}$ are each independently a direct bond or an organic connecting group containing from about 1 to about 20 carbons; $R^{1a}$ is H, optionally substituted $C_1$-$C_{20}$ alkyl, optionally substituted $C_6$-$C_{12}$ aryl, optionally substituted $C_7$-$C_{20}$ aralkyl, optionally substituted $C_2$-$C_{20}$ alkenyl, Group I metal ion, Group II metal ion, or $NR^{2a}_4$, wherein each $R^{2a}$ is independently chosen from H, optionally substituted $C_1$-$C_{20}$ alkyl, optionally substituted $C_6$-$C_{12}$ aryl, optionally substituted $C_7$-$C_{20}$ aralkyl, and optionally substituted $C_2$-$C_{20}$ alkenyl. The polymer or polymeric reaction product can have a weight average molecular weight of at least about 500.

In some embodiments, the organic connecting groups $A^{1a}$ and $A^{2a}$ can be each independently represented by -$A^{3a}$-$A^{4a}$-$A^{5a}$-$A^{6a}$-, wherein $A^{3a}$ is a direct bond, $NR^{3a}$ or O, where $R^{3a}$ is H or $C_{1-3}$ alkyl; $A^{4a}$ is a direct bond, C=O, optionally substituted $C_1$-$C_{10}$ alkylene, or optionally substituted $C_6$-$C_{12}$ aryl; $A^{5a}$ is a direct bond, O, $NR^{4a}$, amide, urethane or urea, where $R^{4a}$ is H or $C_{1-3}$ alkyl; and $A^{6a}$ is a direct bond, O, optionally substituted $C_1$-$C_{20}$ alkyl, optionally substituted $C_2$-$C_{20}$ alkenyl or optionally substituted $C_7$-$C_{20}$ aralkyl.

In some embodiments, $Q^1$ is chosen from butyl, 2-ethylhexyl, $C_{8-10}$ alkyl, phenyl, cresyl, nonylphenyl, cetyl, octenyl and octadecyl.

In some embodiments, $R^{1a}$ is a Group I metal ion, Group II metal ion, or $NR^{2a}_4$.

The silicon-containing compound can also be a reaction product of at least a polyamine, a first nitrogen-reactive compound, and a second nitrogen-reactive compound. The first nitrogen-reactive compound contains a —Si(OR$^{1b}$)$_3$ group and a nitrogen-reactive group, where $R^{1b}$ is H, optionally substituted $C_1$-$C_{20}$ alkyl, optionally substituted $C_6$-$C_{12}$ aryl, optionally substituted $C_7$-$C_{20}$ aralkyl, optionally substituted $C_2$-$C_{20}$ alkenyl, Group I metal ion, Group II metal ion, or $NR^{2b}_4$, each $R^{3b}$ being independently chosen from H, optionally substituted $C_1$-$C_{20}$ alkyl, optionally substituted $C_6$-$C_{12}$ aryl, optionally substituted $C_7$-$C_{20}$ aralkyl, and optionally substituted $C_2$-$C_{20}$ alkenyl. The second nitrogen-reactive compound contains a nitrogen-reactive group and does not contain a Si(OR$^{1b}$)$_3$ group. At least one of the polyamine and the second nitrogen-reactive compound contains an optionally substituted hydrocarbyl radical containing from about 2 to about 40 carbons. The reaction product can have a weight average molecular weight of at least about 500, In some embodiments, the first nitrogen-reactive compound is chosen from glycidoxypropyltrimethoxysilane, glycidoxypropyltriethoxysilane and chloropropyltrimethoxysilane.

In some embodiments, the second nitrogen-reactive compound is chosen from alkylhalides, glycidoxy ethers and alkyl epoxides.

In some embodiments, the second nitrogen-reactive compound is chosen from dimethylsulfate, chlorooctane, chlorohexane, benzyl chloride, epichlorohydrin, glycidyl 4-nonylphenylether, butyl glycidyl ether, 2-ethylhexyl glycidyl ether, phenyl glycidyl ether, $C_{12}$-$C_{14}$ alkyl glycidyl ether, cresyl glycidyl ether, octenylsuccinic anhydride, $C_{8-10}$ alkyl halide, $C_{8-10}$ alkyl glycidyl ether and octadecenylsuccinic anhydride.

In some embodiments the silicon-containing compound can be a polymer according to Formula (III)— wherein w is 1-99.9%, x is 0.1-50%, y is 0-50%, z is 0-50%; and $Q^3$ is $C_1$-$C_{10}$ alkyl, aryl, amide, acrylate, ether, or COX$^1$R$^{1c}$, where X$^1$ is O, NH, or NP$^1$, where P$^1$ is $C_1$-$C_3$ alkyl, aryl, or O; R$^{1c}$ is H, Na, K, NH$_4$, $C_1$-$C_{10}$ alkyl or aryl; R$^{2c}$ is $C_1$-$C_{10}$ alkyl or aryl; V$^1$ and V$^2$ are independently H, $C_1$-$C_3$ alkyl, aryl, Na, K or NH$_4$ or forms an anhydride ring; R$^{3c}$ is H, $C_1$-$C_3$ alkyl, aryl, Na, K or NH$_4$, and D$^1$ is NR$^{4c}_2$ or OR$^{4c}$, wherein R$^{4c}$ is H, $C_1$-$C_{20}$ alkyl, $C_1$-$C_{20}$ alkenyl or aryl.

In some embodiments the silicon-containing compound is a polysaccharide having pendant thereto a group or an end group containing —Si(OR$^{1d}$)$_3$, wherein R$^{1d}$ is Na, K or NH$_4$.

In some embodiments the silicon-containing compound can be a polymer having pendant thereto a group or an end group according to Formula IV —Si(OR")$_3$         Formula IV:

where R"=H, $C_1$-$C_{10}$ alkyl, aryl, arylalkyl, Na, K or NH$_4^+$ as described in WO2004/009606.

In some embodiments, the silicon-containing compound is a polymer having pendant thereto an end group or pendant group according to Formula V -G-R—X—R'—Si(OR")$_3$      Formula V:

wherein G=no group, NH, NR", or O; R=no group, C+O, O, C1-C10 alkyl, aryl, arylalkyl; X=no group, NR, O, NH, amide, urethane, or urea; R'=no group, O, C1-C10 alkyl, aryl, arylalkyl, and R"=H, C1-C10 alkyl, aryl, arylalkyl, Na, K or NH$_4^+$.

In some embodiments, the silicon-containing compound is a polysaccharide having pendant thereto a pendant group or an end group containing —Si(OR$^{1e}$)$_3$, wherein R$^{1e}$ is H, $C_1$-$C_{10}$ alkyl, aryl, Na, K or NH$_4$. In some embodiments, the end group or pendant group contains a structure according to Formula VI -G$^1$-R$^{2e}$—X$^2$—R$^{3e}$—Si(OR$^{4e}$)$_3$     Formula VI:

wherein G$^1$ is absent, NH, NR$^{4e}$ or O; R$^{2e}$ is absent, C=O, O, $C_1$-$C_{10}$ alkyl, or aryl; X$^2$ is absent, NR$^{2e}$, O, NH, amide, urethane, or urea; R$^{3e}$ is absent, O, $C_1$-$C_{10}$ alkyl, or aryl; and R$^{4e}$ is H, $C_1$-$C_3$ alkyl, aryl, Na, K or NH$_4$.

In some embodiments, the silicon-containing compound is a reaction product of an amine-containing molecule and an amine-reactive molecule having at least one amine-reactive group per molecule and at least one —Si(OR$^{5e}$)$_n$ group per molecule, wherein R$^{5e}$ is hydrogen, $C_1$-$C_{12}$ alkyl, aryl, Na, K, Li, or NH$_4$.

In some embodiments, the silicon-containing compound contains least three components, wherein one is a R$^{1f}$ component, one is a R$^{2f}$ component and one is a R$^{3f}$ component. The components within the compound are arranged according to general Formula VII—

(VII)

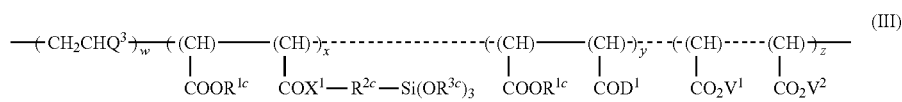

(III)

wherein the compound is at least one of carbonates, bicarbonates, carbamates, ureas, amides and salts thereof; and wherein $R^{1f}$ is chosen from H, alkyl, amine, alkylamine, structure (VIII) and structure (IX)—

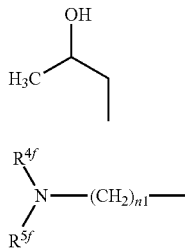

(VIII)

(IX)

$R^{2f}$ and $R^{4f}$ are independently chosen from H, alkyl, amine, alkylamine, GG and EE, wherein GG is chosen from 3-glycidoxypropyltrimethoxysilane, 3-glycidoxypropyltrialkoxysilane, 3-glycidoxypropylalkyldialkoxysilane, 3-glycidoxypropyldialkylmonoalkoxysilane, 3-isocyanatopropyltrialkoxysilane, 3-isocyanatopropylalkyldialkoxysilane, 3-isocyanatopropyldialkylmonoalkoxysilane, 3-chloropropyltrialkoxysilane, 3-chloropropylalkyldialkoxysilane, and 3-chloropropyldialkylmonoalkoxysilane; wherein EE is chosen from 2-ethylhexyl glycidyl ether, n-butyl glycidyl ether, t-butyl glycidyl ether, $C_3$-$C_{22}$ glycidyl ether, $C_3$-$C_{22}$ isocyanate, $C_3$-$C_{22}$ chloride, $C_3$-$C_{22}$ bromide, $C_3$-$C_{22}$ iodide, $C_3$-$C_{22}$ sulfate ester, $C_3$-$C_{22}$ phenolglycidyl ether, and any combination thereof; $R^{3f}$ and $R^{5f}$ are independently chosen from H, alkyl, aminealkylamine, GG and EE; and n1 is an integer from 2 to 6.

In some embodiments, the silicon-containing compound includes at least one compound having at least three components, wherein the first component of the at least three components is according to general Formula X or XI—

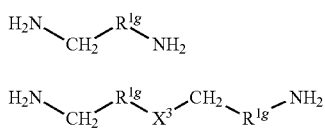

(X)

(XI)

wherein $R^{1g}$ is independently $CH_2$, or $CH_2$—$CH_2$; and $X^3$ is NH, NH—$R^{1g}$—NH, or NH—$R^{1g}$—NH—$R^{1g}$—NH. The second component of the at least three components is 3-glycidoxypropyltrimethyloxysilane, and the third component of the at least three components is 2-ethylhexylglycidyl ether. Synthesis of the compound can occur by combining the first component with the second component at a reactive hydrogen of the first component to form an intermediate, and then reacting this intermediate with the third component to form the compound.

In some embodiments, the silicon containing compound is a compound having one or more $Si(OR^{2g})_n$ groups, wherein $R^{2g}$ is independently chosen from H, $C_1$-$C_{12}$ alkyl, aryl, Na, K, Li, and $NH_4$.

In some embodiments, the silicon-containing compound is a polymer having pendant thereto a group or end group according to Formula XII—

(XII)

wherein v is an integer of either 1 or 2; v+w=3; $R^{1h}$ is chosen from H, $C_1$-$C_{12}$, alkyl, aryl, Na, K, Li, and $NH_4$; and J is chosen from H and a hydrocarbon group having a number of carbons within the range of 1 to 20.

In some embodiments, the silicon-containing compound having one or more —Si(OR)$_n$ groups is a polymer having one or more units according to Formula XIII and one or more units according to Formula XIV—

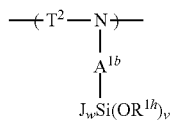

(XIII)

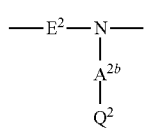

(XIV)

wherein $A^{1b}$ and $A^{2b}$ are each independently a hydrocarbon group having a number of carbons within the range of 1 to 20 carbons or $A^{1b}$ and $A^{2b}$ are each independently a direct bond between the nitrogen atom and the adjoining group; $T^2$ and $E^2$ are each independently a hydrocarbon group having a number of carbons within the range of 2 to 40; and $Q^2$ is chosen from H and a hydrocarbon group having a number of carbons within the range of 1 to 20. The molecular weight of the polymer is at least 500, and $Q^2$ does not contain a silane group.

From the above it is seen that a wide variety of silicon containing compounds can be used in the process of the present invention. It has also been determined that optimum treatment liquor composition varies for each of the silicon containing compounds described herein. Thus, for each silicon containing compound, it is advantageous to determine the optimum levels and types of salts that should be employed in order to maximize the degree of scale inhibition Likewise, it is advantageous to determine the optimum combination of pH and salt(s) in the treatment compositions.

EXAMPLES

In all examples, the synthetic Bayer liquor (SBL) used in the scaling tests contained 45 g/L $Al_2O_3$ (0.441M), 120.0 g/L NaOH (3.0M), 60 g/L $Na_2CO_3$ (0.566M), 20 g/L $Na_2SO_4$ (0.1408M) and 0.8 g/L $SiO_2$ for a total of 245.8 g/L or 24.58% wt/vol, of total dissolved salts. The no-Si synthetic Bayer liquor ("no-Si SBL") samples used for the pretreatment steps did not contain any silica. These no-Si SBL samples contained 45 g/L $Al_2O_3$ (0.441M), 120.0 g/L NaOH (3.0M), 60 g/L $Na_2CO_3$ (0.566M) and 20 g/L $Na_2SO_4$ (0.1408M), for a total of 245.0 g/L or 24.5% wt/vol. The pH of the no-Si SBL sample was 13.5.

Carbon-steel (grade SA-36) pressure vessels of 42 ml total volume ("bombs") manufactured by the STEM corporation were used to simulate scaling and scale inhibition in a piece of Bayer process equipment such as a heat exchanger. The bombs were filled with 30 ml of scale inhibiting composition (for the treating step) or SBL (for a "scaling run") and sealed so as to withstand pressure generated as a result of heating. Each bomb was pre-weighed to 0.1 mg after (1) cleaning (abrading) the inner surface with a rotating wire brush attached to a drill press, (2) blowing out debris via an air jet, and (3) allowing to cool to room temperature. The width of the brush used for cleaning the inner surface of the bomb was about the same as the inner diameter of the bomb.

Agitation during the treating step was provided by clamping the bomb to a carousel contained within a forced-draught oven and rotating at 30 rpm for a period of time, generally at 100° C.

After the treating step, the mixture was poured out and the bomb left to stand inverted on a paper towel for about 2 min to drain. The bomb was then filled with 30 ml of SBL, optionally containing red mud solids (for a scaling run). For comparative tests, scale inhibitor was added in situ to the SBL prior to a scaling run without any surface treatment (i.e., to simulate dosing without pretreatment). After being sealed, the steel bomb was then subjected to one or more scaling runs.

For a scaling run, the bomb was rotated on the carousel for either 16 hours at 100° C. or for 75 minutes at 150° C. After the scaling run was completed, the bomb was cooled to room temperature while still rotating on the carousel and then opened. The contents of the bomb were discarded, the bomb rinsed with water, and then dried under vacuum for 1 hour. The bomb was then weighed to within 0.1 mg. The tare weight was subtracted to obtain the mass of wall scale that had formed during the scaling run.

For multiple scaling runs, the bomb was opened after cooling, the contents of the bomb discarded, and the bomb then filled with 30 ml of fresh SBL without allowing the inner walls to dry. The bomb was then placed on the carousel for another run. This was repeated for the number of desired scaling runs. After the final run, wall scale was measured as described in the single run above.

Example 1—Comparison of Pretreatment and Dosing

Silicon-containing compound 1A used in Tests Nos. 1.2 to 1.5 and 1.7 is a polymer having units of Formula I and Formula II, and was prepared according to the procedures disclosed in U.S. Pat. No. 7,999,065. Test No. 1.1 was performed to determine the amount of wall scale formed when no scale inhibitor was used (i.e., no pretreatment solution was made or applied—prior to the scaling run with SBL, the bomb was only mechanically cleaned).

In Test Nos. 1.2 to 1.5, silicon containing compound 1A was directly added to the SBL without the treating step, with the amount of compound 1A varied. For each of tests nos. 1.2 to 1.5, a 5% w/w solution of inhibitor compound 1A was diluted 10-fold using 2 wt % NaOH to make a 0.5% w/w solution. For test 1.2, 60 µl of the 0.5% inhibitor solution was added to the 30 ml SBL present in the bomb to create a 10 mg/l solution of inhibitor (1 µl=1 mg). For Test 1.3, 120 µl was added to create a 20 mg/l solution of inhibitor. For Test 1.4, 180 µl was added to create a 30 mg/l solution of inhibitor. For Test 1.5, 240 µl was added to create a 40 mg/l solution of inhibitor. These tests are labeled as "In situ dosing" in Table 1 below. Percentage reductions in wall scale formation for Test Nos. 1.2 to 1.5 were calculated based on the reduction in amount of wall scale formed from that measured in Test No. 1.1 where no inhibitor was added.

Blank Test 1.6 was performed to determine the amount of wall scale formation without use of any of the scale inhibiting composition (i.e., no pretreatment solution was made or applied—prior to the scaling run with SBL, the bomb was only mechanically cleaned).

Percentage reduction in wall scale formed for Test No 1.7 was calculated based on the reduction in the amount of wall scale formed from that measured in Test No. 1.6 (i.e., scale formation without use of a scale inhibitor). In Test No 1.7, 30 ml of no-Si SBL was added to the bomb. A 5% w/w solution of silicon containing compound 1A was diluted 10-fold using 2 wt % NaOH to make a 0.5% w/w solution. This 0.5% w/w solution was added with stifling in an amount of 60 µl to the no Si-SBL liquor to form the scale inhibiting composition of the invention. The scale inhibiting composition was then used to treat the interior surface of the bomb, with agitation, at 100° C. for 4 hours as described above before any scaling runs were performed. The scale inhibitor composition was removed from the bomb after the treatment step after the bomb had been cooled.

One scaling run was then performed for each of the tests using SBL. The scaling run was performed at 100° C. for 16 hours following procedures described above, and the amount of wall scale then measured.

TABLE 1

Comparison of scale inhibition results using the treating prior to exposure and in situ dosing

| Test # | Treatment | Silicon-containing compound concentration (mg/l) | Wall scale amount (mg) | % reduction in wall scale |
|---|---|---|---|---|
| 1.1 | None | 0.00 | 16.40 | 0.00 |
| 1.2 | In situ dosing | 10.00 | 24.20 | −47.56 |
| 1.3 | In situ dosing | 20.00 | 4.40 | 73.17 |
| 1.4 | In situ dosing | 30.00 | 3.70 | 77.44 |
| 1.5 | In situ dosing | 40.00 | 0.80 | 95.12 |
| 1.6 | treating step | 0.00 | 24.50 | 0.00 |
| 1.7 | treating step | 10.00 | 0.70 | 97.14 |

Table 1 shows that the scale inhibition process of the current invention significantly reduces the amount of inhibitor required to effectively inhibit scale formation.

Example 2

Duplicate Test Nos. 2.1 and 2.2 were performed to determine the amount of wall scale formation without the treating step (i.e., no scale inhibiting composition was applied in Test Nos. 2.1 and 2.2 prior to scaling runs). Instead, only 30 ml of non-Si SBL was added to the bomb as a pretreatment prior to the scaling run. The no-Si SBL was used to treat the interior surface of the bomb, with agitation, at 100° C. for 4 hours as described above before any scaling runs were performed. The no-Si SBL was removed from the bomb after the treatment step after the bomb had been cooled.

The value shown in Table 2 for Test No. 2.3 is the average of the results for Test Nos. 2.1 and 2.2. Percentage reductions in wall scale formation for Test Nos. 2.4 to 2.8 were calculated based on reduction in amount of wall scale formation from that measured in Test No. 2.3.

In Test Nos. 2.4 to 2.8, silicon containing compound 2A is the polymeric reaction Product #7 as disclosed in Table 9 at the top of col. 18 of U.S. Pat. No. 7,999,065 having units of Formula (I) and units of Formula (II). Compound 2A was prepared according to the procedures disclosed in the '065 patent using polyethyleneimine, glycidoxypropyltrimethoxysilane (8.0 mole %) and octyl/decylglycidyl ether (10.0 mole %) reactants. Polyethyleneimine (Lupasol PR8515 from BASF, Ludwigshafen, Germany) (1.90 g) was mixed homogeneously with octyl/decyl glycidyl ether (1.00 g) and 3-(glycidyloxypropyl)trimethoxysilane (0.835 g). The mixture was heated at 100° C. overnight to give a solid gel. Aqueous NaOH solution (2 wt %) was then added to make a 5 wt % active solution, wherein the activity value of 5% is based on the weight of the gel (unhydrolyzed compound). Compound 2A was added with stirring to the no-Si SBL to form the scale inhibiting composition used in the treating step. The scale inhibiting composition was used to treat the interior surface of the bomb following the same steps described in Example 1 above prior to the scaling run.

In Test Nos. 2.4 to 2.8, silicon containing compound 2A was added to the no-Si SBL without the treating step, with the amount of compound 2A varied. For each of the tests nos. 2.4 to 2.8, a 5% w/w solution of inhibitor compound 2A was diluted 10-fold using 2 wt % NaOH to make a 0.5% w/w solution. For test 2.4, 60 µl of the 0.5% inhibitor solution was added to the 30 ml no-Si SBL present in the bomb to create a 10 mg/l solution of inhibitor (1 µl=1 mg). For test 2.5, 120 µl was added to create a 20 mg/l solution of inhibitor. For test 2.6, 180 µl was added to create a 30 mg/l solution of inhibitor. For test 2.7, 240 µl was added to create a 40 mg/l solution of inhibitor. For test 2.8, 300 µl was added to create a 50 mg/l solution of inhibitor.

One scaling run was performed for each test using the SBL. The scaling run was performed at 150° C. for 1.25 hours following the procedures described above, and the amount of wall scale then measured.

TABLE 2

Comparison of different scale inhibiting compositions used in treating step

| Test # | Treatment | Silicon-containing compound concentration (mg/l) | Wall scale amount (mg) | % reduction in wall scale |
|---|---|---|---|---|
| 2.1 | None | 0.00 | 22.00 | NA |
| 2.2 | None | 0.00 | 13.00 | NA |
| 2.3 | None | 0.00 | 17.50 | NA |
| 2.4 | Treating step | 10 | 1.7 | 90.29 |
| 2.5 | Treating step | 20 | 1.6 | 90.86 |
| 2.6 | Treating step | 30 | <0.00 | 100.00 |
| 2.7 | Treating step | 40 | <0.00 | 100.00 |
| 2.8 | Treating step | 50 | <0.00 | 100.00 |

Table 2 shows that complete inhibition of scale can be achieved at modest dosage using the treating step of the invention.

Example 3

Test Nos. 3.1 and 3.2 were performed to determine the amount of wall scale formation without performing the treating step prior to exposure to SBL. No scale inhibiting composition was used in Test Nos. 3.1 and 3.2 (i.e., no pretreatment with scale inhibiting composition or pretreatment with no-Si SBL was applied in Test Nos. 3.1 and 3.2 prior to the scaling runs).

The value shown in Table 3 for Test No 3.3 is the average of the results for Test Nos. 3.1 and 3.2. The percentage reductions in wall scale formation for Test Nos. 3.4 to 3.0 were calculated based on the amount of wall scale formation measured in Test No. 3.3.

In Test Nos. 3.4 to 3.9, the same compound 2A used in Example 2 was used here as the silicon-containing compound, with the amount of scale-inhibiting compound 2A varied. For each of the tests nos. 3.4 to 3.9, a 5% w/w solution of inhibitor compound 2A was diluted 10-fold using 2 wt % NaOH to make a 0.5% w/w solution. For test 3.4, 60 µl of the 0.5% inhibitor solution was added to the 30 ml SBL present in the bomb to create a 10 mg/l solution of inhibitor (1 µl=1 mg). For test 3.5, 120 µl was added to the 30 ml SBL present in the bomb to create a 20 mg/l solution of inhibitor. For test 3.6, 180 µl was added to create a 30 mg/l solution of inhibitor. For test 3.7, 240 µl was added to create a 40 mg/l solution of inhibitor. For test 3.8, 300 µl was added to create a 50 mg/l solution of inhibitor. For test 3.9, 360 µl was added to the 30 ml SBL present in the bomb to create a 60 mg/l solution of inhibitor. This compound 2A was added directly to the SBL before the scaling run without any prior treatment of the steel equipment surface with inhibitor. This is denoted as "In situ" addition of scale inhibitor.

One scaling run was performed for each of the tests using the SBL without any solids. The scaling run was performed at 150° C. for 1.25 hours following the procedures described above, and the amount of wall scale then measured.

TABLE 3

Comparison of different scale inhibiting compositions used in in situ dosing

| Test # | Treatment | Silicon-containing compound concentration (mg/l) | Wall scale amount (mg) | % reduction in wall scale |
|---|---|---|---|---|
| 3.1 | None | 0.00 | 19.4 | NA |
| 3.2 | None | 0.00 | 17.1 | NA |
| 3.3 | None | 0.00 | 18.25 | NA |
| 3.4 | In situ dosing | 10 | 35.7 | −95.62 |
| 3.5 | In situ dosing | 20 | 18.9 | −3.56 |
| 3.6 | In situ dosing | 30 | 15.7 | 13.97 |
| 3.7 | In situ dosing | 40 | 8.3 | 54.52 |
| 3.8 | In situ dosing | 50 | 3.6 | 80.27 |
| 3.9 | In situ dosing | 60 | <0.00 | 100.00 |

A comparison of Tables 2 and 3 illustrates that when the treatment process of the current invention is used, the amount of scale inhibitor required to completely eliminate scaling is significantly reduced.

Example 4—Scale Reduction in Presence of High Solids

Example 4 illustrates the effect of reducing scale in the presence of red mud solids. Test Nos. 4.1 and 4.2 were performed to determine the amount of wall scale formation without the treating (or pretreatment) step (i.e., no scale inhibiting composition was used in the pretreatment step in Test Nos. 4.1 and 4.2). 30 ml of no-Si SBL was added to the bomb for pretreatment prior to the scaling run with red mud solids.

The value shown in Table 4 for Test No. 4.3 is the average of the results for Test Nos. 4.1 and 4.2. Percentage reductions in wall scale formation for Test Nos. 4.4 to 4.8 were calculated based on reduction in the amount of wall scale formation from that measured in Test No. 4.3.

In Test Nos. 4.4 to 4.8, compound 2A used in Example 2 was used as the silicon-containing compound, with the amount of scale-inhibiting compound 2A varied. For each of the tests nos. 4.4 to 4.8, a 5% w/w solution of inhibitor compound 2A was diluted 10-fold using 2 wt % NaOH to make a 0.5% w/w solution. For test 4.4, 60 μl of the 0.5% inhibitor solution was added to the 30 ml no-Si SBL present in the bomb to create a 10 mg/l solution of inhibitor (1 μl=1 mg). For test 4.5, 120 μl was added to the 30 ml no-Si SBL present in the bomb to create a 20 mg/l solution of inhibitor. For test 4.6, 180 μl was added to create a 30 mg/l solution of inhibitor. For test 4.7, 240 μl was added to create a 40 mg/l solution of inhibitor. For test 4.8, 300 μl was added to create a 50 mg/l solution of inhibitor. For each test, Compound 2A was added with stirring to the no-Si SBL to form the scale inhibiting composition used in the treating step. The scale inhibiting composition was used to treat the interior surface of the bomb following the steps described in Example 1 above.

One scaling run was performed for each of the tests using the SBL containing 400 mg/L red mud solids. The scaling run was performed at 150° C. for 1.25 hours following the procedures described above, and the amount of wall scale then measured.

TABLE 4

Example 4 Scaling Run Results

| Test # | Treatment | Silicon-containing compound concentration (mg/l) | Red mud solids (mg/l) | Wall scale amount (mg) | % reduction in wall scale |
|---|---|---|---|---|---|
| 4.1 | None | 0.00 | 400.00 | 10.7 | NA |
| 4.2 | None | 0.00 | 400.00 | 11.4 | NA |
| 4.3 | None | 0.00 | 400.00 | 11.1 | NA |
| 4.4 | Treating step | 10 | 400.00 | 2.0 | 81.90 |
| 4.5 | Treating step | 20 | 400.00 | <0.00 | 100.00 |
| 4.6 | Treating step | 30 | 400.00 | <0.00 | 100.00 |
| 4.7 | Treating step | 40 | 400.00 | <0.00 | 100.00 |
| 4.8 | Treating step | 50 | 400.00 | <0.00 | 100.00 |

Table 4 illustrates that, even in the presence of red mud solids, the treatment process of the current invention eliminates scaling at an economic dose. No in situ addition or dosing of scale inhibitor is required.

Example 5—High Solids Dosing

Example 5 shows the effectiveness of in situ addition for inhibiting scale in the presence of red mud solids. For all Test Nos. 5.1 to 5.13, 12 mg of red mud solids was added to SBL (400.00 mg/L of red mud solids) to create a 30 ml slurry in the bomb for the scaling run.

Test Nos. 5.1 and 5.2 were performed to determine the amount of wall scale formed without the treating step. No scale inhibiting composition was used in Test Nos. 5.1 and 5.2 (i.e., no pretreatment with scale inhibiting composition or pretreatment with no-Si SBL was applied in Test Nos. 5.1 and 5.2 prior to the scaling runs with slurry). Scaling runs were made just using the 30 ml slurry.

The value shown in Table 5 for Test No. 5.3 is the average of the results for Test Nos. 5.1 and 5.2. Percentage reductions in wall scale formation for Test Nos. 5.4 to 5.13 were calculated based on reduction in amount of wall scale formation from that measured in Test No. 5.3.

In Test Nos. 5.4 to 5.13, compound 2A used in Example 2 was used here as the silicon-containing compound. For each of Tests Nos. 5.4 to 5.13, a 5% w/w solution of inhibitor compound 2A was diluted 10-fold using 2 wt % NaOH to make a 0.5% w/w solution. For test 5.4, 60 μl of the 0.5% inhibitor solution was added to the 30 ml slurry present in the bomb to create a 10 mg/l solution of inhibitor (1 μl=1 mg). For test 5.5, 120 μl was added to the 30 ml slurry present in the bomb to create a 20 mg/l solution of inhibitor. For test 5.6, 180 μl was added to create a 30 mg/l solution of inhibitor. For test 5.7, 240 μl was added to create a 40 mg/l solution of inhibitor. For test 5.8, 300 μl was added to create a 50 mg/l solution of inhibitor. For test 5.9, 360 μl was added to the 30 ml slurry present in the bomb to create a 60 mg/l solution of inhibitor. For test 5.10, 420 μl was added to the 30 ml slurry present in the bomb to create a 70 mg/l solution of inhibitor. For test 5.11, 480 μl was added to the 30 ml slurry present in the bomb to create a 80 mg/l solution of inhibitor. For test 5.12, 540 μl was added to the 30 ml slurry present in the bomb to create a 90 mg/l solution of inhibitor. For test 5.13, 600 μl was added to the 30 ml slurry present in the bomb to create a 100 mg/l solution of inhibitor. Compound 2A was added directly to the slurry (i.e., in situ addition without any prior equipment surface treating step).

One scaling run was performed for each of the tests using the slurry of SBL containing red mud solids. The scaling run was performed at 150° C. for 1.25 hours following the procedures described above, and the amount of wall scale then measured.

TABLE 5

Comparison of different scale inhibiting compositions used in in situ dosing

| Test # | Treatment | Silicon-containing compound concentration (mg/L) | Red mud solids (mg/L) | Wall scale amount (mg) | % reduction in wall scale |
|---|---|---|---|---|---|
| 5.1 | None | 0.00 | 400.00 | 17.7 | NA |
| 5.2 | None | 0.00 | 400.00 | 17.1 | NA |
| 5.3 | None | 0.00 | 400.00 | 17.4 | NA |
| 5.4 | In situ dosing | 10 | 400.00 | 30.4 | −74.71 |
| 5.5 | In situ dosing | 20 | 400.00 | 26.4 | −51.72 |
| 5.6 | In situ dosing | 30 | 400.00 | 12.0 | 31.03 |
| 5.7 | In situ dosing | 40 | 400.00 | 9.7 | 44.25 |
| 5.8 | In situ dosing | 50 | 400.00 | 12.8 | 26.44 |
| 5.9 | In situ dosing | 60 | 400.00 | 6.6 | 62.07 |
| 5.10 | In situ dosing | 70 | 400.00 | 5.2 | 70.11 |
| 5.11 | In situ dosing | 80 | 400.00 | 5.7 | 67.24 |
| 5.12 | In situ dosing | 90 | 400.00 | 5.5 | 68.39 |
| 5.13 | In situ dosing | 100 | 400.00 | 3.6 | 79.31 |

Table 5 shows that in situ addition of scale inhibitor does not completely inhibit scale in the presence of red mud solids, at least without dosing a significant amount of scale inhibitor.

Example 6—Small Molecule Scale Inhibition

Example 6 considers the effectiveness of small molecule compounds on scale inhibition. Test Nos. 6.1 and 6.2 were performed to determine the amount of wall scale formation without first treating the bomb with a scale inhibitor composition (i.e., no small molecule scale inhibiting composition was used in Test Nos. 6.1 and 6.2). For Test No. 6.1, a solution of 2% NaOH was added dropwise to deionized ('DI') water with stirring until a pH of 10.51 was achieved. 30 ml of this solution was then transferred to the bomb for pretreatment. For Test No. 6.2, a solution of 2% NaOH was added dropwise to deionized ('DI') water with stirring until a pH of 10.56 was achieved. 30 ml of this solution was then transferred to the bomb for pretreatment.

The value shown in Table 6 for Test No. 6.3 is the average of the results for Test Nos. 6.1 and 6.2. Percentage reductions in wall scale formation for Test Nos. 6.4 to 6.13 were calculated based on reduction in the amount of wall scale formation from that measured in Test No. 6.3.

In Test Nos. 6.4 to 6.8, silicon containing compound 6A was a small molecule compound having the structure illustrated at the top of column 5 and claim 2 of U.S. Pat. No. 8,545,776 B2, as well as claim 4 of U.S. Patent Application Publication No. 2013/0189529A1, the preparation of which is disclosed in Example 2a of U.S. Pat. No. 6,867,318 B1, using a mixture of 2,2,4-trimethyl-1,6-hexanediamine and 2,4,4-trimethyl-1,6-hexanediamine with glycidoxypropyltrimethoxysilane in a 1 to 4 molar ratio of diamine to silane. 2,2,4(2,4,4)-trimethyl-1,6-hexanediamine (0.837 g, 0.0053 mole, 20 mole %) was mixed with 3-(glycidyloxypropyl) trimethoxysilane (5.00 g, 0.0212 mole, 80 mole %) (i.e., a 1:4 mole ratio reaction product) homogeneously. The mixture was heated at 75° C. for 3 hours to give a solid gel. Compound 6A was then diluted in 2% NaOH to give a 5% concentration by weight stock solution prior to use. (Aqueous NaOH solution (2 wt %) was added to make a 5 wt % solution, wherein the activity value of 5% is based on the weight of the gel (unhydrolyzed compound)).

Compound 6A was then further diluted with stirring in deionized water to form the scale inhibiting composition used in the treating step as shown in Table 6. For test 6.4, 20 µl of the 5.0 wt % inhibitor solution of Compound 6A was added to 100 ml DI water in a beaker to create a 10 mg/l inhibitor solution (1 µl=1 mg). The pH of this solution was measured to be 9.31. A 30 ml aliquot of this solution was then transferred to the bomb for pretreatment. For test 6.5, 40 µl of the 5.0 wt % inhibitor solution of Compound 6A was added to 100 ml DI water in a beaker to create a 20 mg/l inhibitor solution (1 µl=1 mg). The pH of this solution was measured to be 9.84. A 30 ml aliquot of this solution was then transferred to the bomb for pretreatment. For test 6.6, 60 µl of the 5.0 wt % inhibitor solution of Compound 6A was added to 100 ml DI water in a beaker to create a 30 mg/l inhibitor solution (1 µl=1 mg). The pH of this solution was measured to be 10.18. A 30 ml aliquot of this solution was then transferred to the bomb for pretreatment. For test 6.7, 80 µl of the 5.0 wt % inhibitor solution of Compound 6A was added to 100 ml DI water in a beaker to create a 40 mg/l inhibitor solution (1 µl=1 mg). The pH of this solution was measured to be 10.33. A 30 ml aliquot of this solution was then transferred to the bomb for pretreatment. For test 6.8, 100 µl of the 5.0 wt % inhibitor solution of Compound 6A was added to 100 ml DI water in a beaker to create a 50 mg/l inhibitor solution (1 µl=1 mg). The pH of this solution was measured to be 10.46. A 30 ml aliquot of this solution was then transferred to the bomb for pretreatment.

In Test Nos. 6.9 to 6.13, the silicon containing small molecule compound used was Compound 6B. The scale inhibitor according to the structure of Compound 6B, disclosed in the Example of U.S. Patent Application Publication No. 2013/0189529, was prepared according to the procedure described in Table 3, Sample C of U.S. Patent Publication No. 2012/0148462. Compound 6B is the reaction product of tetraethylenepentamine, ethylhexylglycidyl ether and glycidoxypropyltrimethoxysilane in a 1.0:0.8:2.0 molar ratio. Tetraethylenepentamine (2.00 g, 0.0106 mole, 26.3 mole %) was mixed with 2-ethylhexyl glycidyl ether (1.58 g, 0.0085 mole 21.1 mole %) and 3-(glycidyloxypropyl)trimethoxysilane (5.00 g, 0.0212 mole, 52.6 mole %) homogeneously (a 1.0:0.8:2.0 mole ratio product). The mixture was heated at 75° C. overnight to give the product as a solid gel. Aqueous NaOH solution (2 wt %) was then added to make a 5 wt % solution, wherein the activity value of 5% is based on the weight of the gel (unhydrolyzed compound).

Compound 6B was then further diluted with stirring in deionized water to form the scale inhibiting composition used in the treating step as shown in Table 6. For test 6.9, 20 µl of the 5.0 wt % inhibitor solution of Compound 6B was added to 100 ml DI water in a beaker to create a 10 mg/l inhibitor solution (1 µl=1 mg). The pH of this solution was measured to be 9.6. A 30 ml aliquot of this solution was then transferred to the bomb for pretreatment. For test 6.10, 40 µl of the 5.0 wt % inhibitor solution of Compound 6B was added to 100 ml DI water in a beaker to create a 20 mg/l inhibitor solution (1 µl=1 mg). The pH of this solution was measured to be 9.76. A 30 ml aliquot of this solution was then transferred to the bomb for pretreatment. For test 6.11, 60 µl of the 5.0 wt % inhibitor solution of Compound 6B was added to 100 ml DI water in a beaker to create a 30 mg/l inhibitor solution (1 µl=1 mg). The pH of this solution was measured to be 10.14. A 30 ml aliquot of this solution was then transferred to the bomb for pretreatment. For test 6.12, 80 µl of the 5.0 wt % inhibitor solution of Compound 6B was added to 100 ml DI water in a beaker to create a 40 mg/l inhibitor solution (1 µl=1 mg). The pH of this solution was measured to be 10.31. A 30 ml aliquot of this solution was then transferred to the bomb for pretreatment. For test 6.13, 100 µl of the 5.0 wt % inhibitor solution of Compound 6B was added to 100 ml DI water in a beaker to create a 50 mg/l inhibitor solution (1 µl=1 mg). The pH of this solution was measured to be 10.42. A 30 ml aliquot of this solution was then transferred to the bomb for pretreatment.

The small molecule scale inhibiting compositions were used to treat the interior surface of the bomb following the steps described in Example 1 above. One scaling run was then performed for each of the tests using SBL. The scaling run was performed at 150° C. for 1.25 hours following the procedures described above, and the amount of wall scale then measured.

TABLE 6

Example 6 Scaling Run Results

| Test # | Treatment | Silicon-containing compound concentration (mg/L) | pH of treatment solution | Silicon containing compound | Red mud solids (mg/L) | Wall scale amount (mgs) | % reduction in wall scale |
|---|---|---|---|---|---|---|---|
| 6.1 | None | 0.00 | 10.51 | None | 0 | 20.9 | — |
| 6.2 | None | 0.00 | 10.56 | None | 0 | 20.0 | — |
| 6.3 | None | 0.00 | 10.5 | None | 0 | 20.5 | — |
| 6.4 | Treating step | 10 | 9.31 | 6A | 0 | 28.8 | −40.83 |

TABLE 6-continued

Example 6 Scaling Run Results

| Test # | Treatment | Silicon-containing compound concentration (mg/L) | pH of treatment solution | Silicon containing compound | Red mud solids (mg/L) | Wall scale amount (mgs) | % reduction in wall scale |
|---|---|---|---|---|---|---|---|
| 6.5 | Treating step | 20 | 9.84 | 6A | 0 | 21.0 | −2.69 |
| 6.6 | Treating step | 30 | 10.18 | 6A | 0 | 26.9 | −31.54 |
| 6.7 | Treating step | 40 | 10.33 | 6A | 0 | 33.7 | −64.79 |
| 6.8 | Treating step | 50 | 10.46 | 6A | 0 | 19.9 | 2.69 |
| 6.9 | Treating step | 10 | 9.6 | 6B | 0 | 29.60 | −44.74 |
| 6.10 | Treating step | 20 | 9.76 | 6B | 0 | 29.7 | −45.23 |
| 6.11 | Treating step | 30 | 10.14 | 6B | 0 | 35.6 | −74.08 |
| 6.12 | Treating step | 40 | 10.31 | 6B | 0 | 29.4 | −43.77 |
| 6.13 | Treating step | 50 | 10.42 | 6B | 0 | 36.7 | −79.46 |

Table 6 shows that treating the surface of the steel equipment with a solution of the small molecule compounds dissolved in deionized water prior to conducting the scaling test did not result in any inhibition of scale.

Example 7—Scale Inhibition Using Non-Bayer Pretreatment Liquor

Example 7 shows the use of treatment liquor which is not Bayer liquor. Test Nos. 7.1 and 7.3 were performed to determine the amount of wall scale formation without first treating the bomb with a scale inhibiting composition (i.e. no scale inhibiting composition was used in Test Nos. 7.1 and 7.3). For test no. 7.1, a 20% w/w solution of $Na_2SO_4$ was made by combining 200 g of sodium sulfate with 800 g of DI water with stirring to dissolve the solid in the water. The pH of this solution was measured to be 6.16. A 30 ml aliquot of this solution was then transferred to the bomb for pretreatment for 16 hours at 100° C. For Test No 7.3, 100 ml of the 20% wt/wt $Na_2SO_4$ solution was added to a beaker together with 20 µl of a 2% wt/wt NaOH solution, giving a solution having a pH of 9.1. A 30 ml aliquot of this solution was then transferred to the bomb for pretreatment for 16 hours at 100° C. Following the pretreatment step with solution not containing any inhibitor in Test Nos. 7.1 and 7.3, three consecutive scaling runs, each lasting 75 minutes at 150° C., were conducted in the presence of 400 mg/l of red mud solids dispersed in SBL In Examples 7.2 and 7.4-7.9, scale inhibitor 2A (Example 2 above) was dissolved in liquor containing 20% wt/wt of sodium sulfate in water to form the treatment composition. The pH was adjusted with either NaOH or sulfuric acid to the values shown in Table 7 to show the effect of pH on the effectiveness of the treatment liquor. Treatment time was 16 hours at 100° C. In all of these tests three consecutive scaling runs, each lasting 75 minutes at 150° C., were conducted in the presence of 400 mg/L of red mud solids dispersed in SBL.

For test no. 7.2, 30 ml of the 20% w/w $Na_2SO_4$ solution of test 7.1 was added to the bomb followed by 600 µl of a 5% w/w solution of scale inhibitor 2A (Example 2 above) to create a 1000 mg/l inhibitor solution (1 µl=1 mg).

For test no. 7.4, 100 ml of the 20% w/w $Na_2SO_4$ solution was added to a beaker together with 20 µl of a 2 wt % NaOH solution, giving a solution having a pH of 9.1. 30 ml of this solution was then transferred to a bomb followed by 600 µl of a 5% w/w solution of scale inhibitor 2A to create a 1000 mg/l inhibitor solution.

For test no. 7.5, 100 ml of the 20% w/w $Na_2SO_4$ solution was added to a beaker together with 50 µl of a 50 wt % sulfuric acid solution and 50 µl of a 10 wt % sulfuric acid solution, giving a solution having a pH of 3.00. 30 ml of this solution was then transferred to a bomb followed by 600 µl of a 5% w/w solution of scale inhibitor 2A to create a 1000 mg/l inhibitor solution.

For test no. 7.6, 100 ml of the 20% w/w $Na_2SO_4$ solution was added to a beaker together with 5 µl of a 10 wt % sulfuric acid solution, giving a solution having a pH of 4.90. 30 ml of this solution was then transferred to a bomb followed by 600 µl of a 5% w/w solution of scale inhibitor 2A to create a 1000 mg/l inhibitor solution.

For test no. 7.7, 100 ml of the 20% w/w $Na_2SO_4$ solution was added to a beaker together with 150 µl of a 50 wt % NaOH solution, 45 µl of a 2 wt % NaOH solution, and 20 µl of a 10 wt % sulfuric acid solution, giving a solution having a pH of 11.00. 30 ml of this solution was then transferred to a bomb followed by 600 µl of a 5% w/w solution of scale inhibitor 2A to create a 1000 mg/l inhibitor solution.

For test no. 7.8, 100 ml of the 20% w/w $Na_2SO_4$ solution was added to a beaker together with 700 µl of a 50 wt % NaOH solution and 850 µl of a 50 wt % sulfuric acid solution, giving a solution having a pH of 12.00. 30 ml of this solution was then transferred to a bomb followed by 600 µl of a 5% w/w solution of scale inhibitor 2A to create a 1000 mg/l inhibitor solution.

For test no. 7.9, 100 ml of the 20% w/w $Na_2SO_4$ solution was added to a beaker together with 1400 µl of a 50 wt % NaOH solution, giving a solution having a pH of 13.00. 30 ml of this solution was then transferred to a bomb followed by 600 µl of a 5% w/w solution of scale inhibitor 2A to create a 1000 mg/l inhibitor solution.

TABLE 7

Example 7 Scaling Run Results

| Test # | Treatment | Silicon-containing compound concentration (mg/L) | pH of treatment liquor | Wall scale amount (mgs) | % reduction in wall scale |
|---|---|---|---|---|---|
| 7.1 | None | 0 | 6.16 | 58.4 | — |
| 7.2 | Treatment | 1000 | 6.16 | 21.1 | 63.9 |
| 7.3 | None | 0 | 9.1 | 57.7 | — |
| 7.4 | Treatment | 1000 | 9.1 | 21.1 | 63.43 |
| 7.5 | Treatment | 1000 | 3.00 | 34.5 | — |
| 7.6 | Treatment | 1000 | 4.90 | 14.8 | — |
| 7.7 | Treatment | 1000 | 11.00 | 15.2 | — |
| 7.8 | Treatment | 1000 | 12.00 | 10.0 | — |
| 7.9 | Treatment | 1000 | 13.00 | 12.9 | — |

Table 7 shows that when the steel surface is first treated with a scale inhibiting composition comprising a silicon containing compound having one or more —Si(OR)$_n$ groups and a treatment liquor (e.g., for Example 7, a sodium sulfate solution as the liquor) different from Bayer process liquor prior to that surface being exposed to a Bayer process stream that induces scale formation, the treatment is effective at inhibiting scale.

Example 8—Inhibitor Structure Variation for Double Stream (Low Solids) Process Example 8 illustrates the use of a variety of compounds containing —Si(OR)$_3$ groups, including both polymeric and small molecule compounds, can be used in a pretreatment application according to the present invention for double stream processes. Examples of useful polymeric compounds containing —Si(OR)$_3$ groups include polymers disclosed in U.S. Pat. No. 7,999,065 (Example 8.1, 8.4 and 8.5), U.S. Pat. No. 8,067,507 (Example 8.3), U.S. Patent Application Publication No. 2006/0124553 (Examples 8.6-8.8), and International Patent Application Publication No. WO 2004/009606 (Example 8.9). A polymeric material containing —Si(OR)$_2$ groups as taught in U.S. Pat. No. 8,282,834 (Example 8.2) was not effective. Small molecules 6A and 6B described above can be made to work in a pretreatment process according to the present invention (Examples 8.10 and 8.11).

For each of the pretreatment runs of Examples 8.1-8.11, the pretreatment liquor was no-Si SBL with a pH of 13.5. The bomb was treated with each solution for 16 hours at a temperature of 100° C. The scaling run results were compared against a bomb treated with a pretreatment liquor of no-Si SBL containing no scale inhibitor and then subjected to three scaling runs.

For Example 8.1, 30 ml no-Si SBL was added to the bomb followed by 600 µl of a 5% w/w solution of Compound 2A (an inhibitor containing —Si(OR)$_3$ groups) to create a 1000 mg/l solution of inhibitor for pretreatment of the bomb (1 µl=1 mg).

For Example 8.2, an inhibitor solution containing a polymer containing —Si(OR)$_2$ groups was prepared by dissolving 5.00 g of polyethyleneimine (PEI, available as Lupasol® WF from BASF) in 5.00 g of ethanol, and then adding 1.09 g of glycidyloxypropylmethyldimethoxysilane and 0.32 g of glycidyl 4-nonylphenylether. The mixture was stirred at 60° C. for 1 hour and then aqueous NaOH solution (2 wt %) was added to make a 5 wt % active solution, wherein the activity value of 5% is based on the weight of the unhydrolyzed compound (6.41 g). 30 ml no-Si SBL was added to the bomb followed by 600 µl of this 5% w/w solution of the inhibitor solution to create a 1000 mg/l solution of inhibitor for pretreatment of the bomb (1 µl=1 mg).

For Example 8.3, an inhibitor solution containing a polymer containing —Si(OR)$_3$ groups was prepared by dissolving 2.02 g of polyethyleneglycol diglycidyl ether (PEG 400-DGE, available from Raschig GmbH, Ludwigshafen, Germany) in 15.93 g water and then adding 0.8599 g 3-(aminopropyl)trimethoxysilane. The solution was stirred at 70° C. for 30 minutes to form a solid gel. Aqueous NaOH solution (2 wt %) was then added to make a 5.9 wt % active solution, wherein the activity value of 5.9% is based on the weight of the gel (unhydrolyzed compound). 30 ml no-Si SBL was added to the bomb followed by 508 µl of this 5.9% w/w inhibitor solution to create a 1000 mg/l inhibitor solution for pretreatment of the bomb (1 µl=1 mg).

For Example 8.4, an inhibitor solution containing a polymer containing —Si(OR)$_3$ groups was prepared by dissolving 20 g of Ethyleneamine E-100 from Huntsman (The Woodlands, Tex.) (E-100 is a mixture of tetraethylenepentamine (TEPA), pentaethylenehexamine (PEHA) and hexaethyleneheptamine (HEHA) with a number-average molecular weight of 250-300 g/mole) in 50 g water, cooling to 0° C. in an ice bath, and then adding 15.5 g epichlorohydrin followed by 13.4 g of 50 wt % NaOH. The solution was kept at reflux for 1 hour before cooling to room temperature and adding 40 g water and 14 g 50 wt % NaOH, followed by the addition of 6.8 g 3-(glycidoxypropyl)trimethoxysilane. The solution was stirred at room temperature overnight. Aqueous NaOH solution (2 wt %) was then added to make a 5.0 wt % active solution, wherein the activity value of 5.0% is based on the weight of the unhydrolyzed compound. 30 ml no-Si SBL was added to the bomb followed by 600 µl of this 5.0% w/w inhibitor solution to create a 1000 mg/l inhibitor solution for pretreatment of the bomb (1 µl=1 mg).

For Example 8.5, an inhibitor solution containing a polymer containing —Si(OR)$_3$ groups and no hydrophobe was prepared by dissolving 4 g of Ethyleneamine E-100 and 2.3 g bis(hexamethylene)triamine in 50 g water, cooling to 3° C. in an ice bath, and then adding 5.33 g epichlorohydrin followed by 3.4667 g of 50 wt % NaOH. The solution was stirred at 28° C. for 20 minutes and then kept at reflux for 1 hour before cooling to room temperature, resulting in a solid gel. A 30.1 g portion of the gel was mixed with 80 g water and 3 g 50 wt % NaOH, followed by stirring overnight at room temperature to obtain a viscous solution. 2.49 g of 3-(glycidoxypropyl)trimethoxysilane was added to the viscous solution, followed by stirring overnight at room temperature. Aqueous NaOH solution (2 wt %) was then added to make a 5.0 wt % active solution, wherein the activity value of 5.0% is based on the weight of the unhydrolyzed compound. 30 ml no-Si SBL was added to the bomb followed by 600 µl of this 5.0% w/w inhibitor solution to create a 1000 mg/l inhibitor solution for pretreatment of the bomb (1 µl=1 mg).

Preparation of the inhibitor solution containing a polymer containing —Si(OR)$_3$ groups of Example 8.6 was according to the procedures described in Examples 8-10 of U.S. Patent Application Publication No. 2006/0124553. For Example 8.6, the following monomers were used: 30 mole % t-octylacrylamide, 10 mole % acrylic acid, 55 mole % acrylamide, and 5 mole % of N-(3-triethoxysilyl)propylacrylamide. Aqueous NaOH solution (2 wt %) was then added to the solid polymer to make a 5.0 wt % active solution, wherein the activity value of 5.0% is based on the weight of the solid polymer. 30 ml no-Si SBL was added to the bomb followed by 600 μl of this 5.0% w/w inhibitor solution to create a 1000 mg/l inhibitor solution for pretreatment of the bomb (1 μl=1 mg).

The inhibitor solution containing a polymer containing —Si(OR)$_3$ groups of Example 8.7 was prepared according to the procedures described in Examples 8-10 of U.S. Patent Application Publication No. 2006/0124553. For Example 8.7, the following monomers were used: 50 mole % acrylic acid, 45 mole % of N-cyclohexylacrylamide, and 5 mole % of N-(3-triethoxysilyl)propylacrylamide. Aqueous NaOH solution (2 wt %) was then added to the solid polymer to make a 5.0 wt % active solution, wherein the activity value of 5.0% is based on the weight of the solid polymer. 30 ml no-Si SBL was added to the bomb followed by 600 μl of this 5.0% w/w inhibitor solution to create a 1000 mg/l inhibitor solution for pretreatment of the bomb (1 μl=1 mg).

The inhibitor solution containing a polymer containing —Si(OR)$_3$ groups of Example 8.8 was prepared according to the procedures described in Examples 8-10 of U.S. Patent Application Publication No. 2006/0124553. For Example 8.8, the following monomers were used: 23.3 mole % t-octylacrylamide, 56.7 mole % acrylic acid, 12 mole % N-vinylpyrrolidone, and 8 mole % of N-(3-triethoxysilyl) propylacrylamide. Aqueous NaOH solution (2 wt %) was then added to the solid polymer to make a 5.0 wt % active solution, wherein the activity value of 5.0% is based on the weight of the solid polymer. 30 ml no-Si SBL was added to the bomb followed by 600 μl of this 5.0% w/w inhibitor solution to create a 1000 mg/l inhibitor solution for pretreatment of the bomb (1 μl=1 mg).

The inhibitor solution containing a polymer containing —Si(OR)$_3$ groups of Example 8.9 was prepared by dissolving 12.12 g of styrene/maleic anhydride copolymer (SMA) in 120 ml dimethylformamide (DMF) at 50° C. A solution of 2.718 g diethylamine, 1.608 g tallow amine, and 3.714 g (3-aminopropyl)trimethoxysilane in 18 ml DMF was added into the above SMA solution slowly under agitation. The resultant DMF solution was heated at 100° C. for 2 hours before cooling to room temperature. The cooled DMF solution was poured into 3000 mL ethyl acetate slowly under agitation to precipitate out SMA polymer as a white solid powder. The powder was filtered, washed with cold ethyl acetate, and dried under vacuum overnight. Aqueous NaOH solution (2 wt %) was then added to the dried white solid polymer to make a 2.0 wt % active solution, wherein the activity value of 2.0% is based on the weight of the solid polymer. 30 ml no-Si SBL was added to the bomb followed by 1500 μl of this 2.0% w/w inhibitor solution to create a 1000 mg/l inhibitor solution for pretreatment of the bomb (1 μl=1 mg).

For Example 8.10, 30 ml no-Si SBL was added to the bomb followed by 600 μl of 5.0% w/w inhibitor solution of Compound 6A (small molecule inhibitor described above) to create a 1000 mg/l inhibitor solution for pretreatment of the bomb (1 μl=1 mg).

For Example 8.11, 30 ml no-Si SBL was added to the bomb followed by 600 μl of 5.0% w/w inhibitor solution of Compound 6B (small molecule inhibitor described above) to create a 1000 mg/l inhibitor solution for pretreatment of the bomb (1 μl=1 mg).

For each of the scaling runs of Examples 8.1-8.11, the scaling run liquor was SBL containing no red mud solids. The scaling tests were run at a temperature of 150° C. for 1.25 hours. Three scaling runs were performed for each test. The pH of the blank pretreatment liquor and that of the pretreatment inhibitors was 13.5. The reduction in wall scale for each Example was compared against a blank—a bomb pretreated with no-Si SBL containing no inhibitor. The results are provided in Table 8.

TABLE 8

Example 8 Scaling Run Results

| Test # | Wall scale amount (mgs) | % reduction in wall scale |
|---|---|---|
| Blank | 66.7 | N/A |
| 8.1 | −0.7 | 101.0 |
| 8.2 | 77.1 | −15.6 |
| 8.3 | 29.0 | 56.5 |
| 8.4 | 65.8 | 1.3 |
| 8.5 | 74.1 | −11.1 |
| 8.6 | −3.9 | 105.8 |
| 8.7 | 0.2 | 99.7 |
| 8.8 | −2.4 | 103.6 |
| 8.9 | 6.3 | 90.6 |
| 8.10 | 61.2 | 8.2 |
| 8.11 | 57.3 | 14.1 |

From the above results it is seen that pretreatment with polymeric inhibitors containing Si(OR)$_3$ groups are useful for the pretreatment process of the present invention (Examples 8.1, 8.3, 8.4 and 8.6-8.9). Pretreatment with small molecule inhibitors (Examples 8.10 and 8.11) have a small effect on the reduction of wall scale. However, pretreatment with polymeric inhibitors containing Si(OR)$_2$ groups (Example 8.2) fail at preventing wall scale, as well as a polymeric inhibitor containing Si(OR)$_3$ groups but no hydrophobe (Example 8.5).

Example 9—Inhibitor Structure Variation for Single Stream (High Solids) Process

Example 9 illustrates the use of a variety of polymeric compounds containing —Si(OR)$_3$ groups can be used in a pretreatment process according to the present invention for single stream applications with high solids (red mud solids).

For each of the pretreatment runs of Examples 9.1-9.4, the pretreatment liquor was no-Si SBL with a pH of 13.5. The bomb was treated with each solution for 16 hours at a temperature of 100° C. The scaling run results were compared against a bomb treated with a pretreatment liquor of no-Si SBL containing no scale inhibitor and then subjected to three scaling runs.

The inhibitor solution containing a polymer containing —Si(OR)$_3$ groups of Example 9.1 was prepared according to the procedures described in Examples 8-10 of U.S. Patent Application Publication No. 2006/0124553. For Example 9.1, the following monomers were used: 30 mole % t-octylacrylamide, 10 mole % acrylic acid, 55 mole % acrylamide, and 5 mole % of N-(3-triethoxysilyl)propylacrylamide. Aqueous NaOH solution (2 wt %) was then added to the solid polymer to make a 5.0 wt % active solution, wherein the activity value of 5.0% is based on the weight of the solid polymer. 30 ml no-Si SBL was added to the bomb followed by 600 μl of this 5.0% w/w inhibitor solution to create a 1000 mg/l inhibitor solution for pretreatment of the bomb (1 μl=1 mg).

The inhibitor solution containing a polymer containing —Si(OR)$_3$ groups of Example 9.2 was prepared according to the procedures described in Examples 8-10 of U.S. Patent Application Publication No. 2006/0124553. For Example 9.2, the following monomers were used: 50 mole % acrylic acid, 45 mole % of N-cyclohexylacrylamide, and 5 mole % of N-(3-triethoxysilyl)propylacrylamide. Aqueous NaOH solution (2 wt %) was then added to the solid polymer to make a 5.0 wt % active solution, wherein the activity value of 5.0% is based on the weight of the solid polymer. 30 ml no-Si SBL was added to the bomb followed by 600 μl of this 5.0% w/w inhibitor solution to create a 1000 mg/l inhibitor solution for pretreatment of the bomb (1 μl=1 mg).

The inhibitor solution containing a polymer containing —Si(OR)$_3$ groups of Example 9.3 was prepared according to the procedures described in Examples 8-10 of U.S. Patent Application Publication No. 2006/0124553. For Example 9.3, the following monomers were used: 23.3 mole % t-octylacrylamide, 56.7 mole % acrylic acid, 12 mole % N-vinylpyrrolidone, and 8 mole % of N-(3-triethoxysilyl) propylacrylamide. Aqueous NaOH solution (2 wt %) was then added to the solid polymer to make a 5.0 wt % active solution, wherein the activity value of 5.0% is based on the weight of the solid polymer. 30 ml no-Si SBL was added to the bomb followed by 600 μl of this 5.0% w/w inhibitor solution to create a 1000 mg/l inhibitor solution for pretreatment of the bomb (1 μl=1 mg).

The inhibitor solution containing a polymer containing —Si(OR)$_3$ groups of Example 9.4 was prepared according to the procedures described in Examples 8-10 of U.S. Patent Application Publication No. 2006/0124553. For Example 9.4, the following monomers were used: 36.7 mole % t-octylacrylamide, 43.3 mole % acrylic acid, 12 mole % N-vinylpyrrolidone, and 8 mole % of N-(3-triethoxysilyl) propylacrylamide. Aqueous NaOH solution (2 wt %) was then added to the solid polymer to make a 5.0 wt % active solution, wherein the activity value of 5.0% is based on the weight of the solid polymer. 30 ml no-Si SBL was added to the bomb followed by 600 μl of this 5.0% w/w inhibitor solution to create a 1000 mg/l inhibitor solution for pretreatment of the bomb (1 μl=1 mg).

For each of the scaling runs of Examples 9.1-9.4, the scaling run liquor was SBL containing red mud solids present in an amount of 400 mg/l. The scaling tests were run at a temperature of 150° C. for 1.25 hours. The pH of the blank pretreatment liquor and that of the pretreatment inhibitors was 13.5. Three scaling runs were performed for each test. The reduction in wall scale for each Example was compared against the blank—a bomb pretreated with no-Si SBL containing no inhibitor. The results are provided in Table 9.

TABLE 9

Example 9 Scaling Run Results

| Test # | Wall scale amount (mgs) | % reduction in wall scale |
|---|---|---|
| Blank | 47.6 | N/A |
| 9.1 | 1.9 | 96.0 |
| 9.2 | 4.4 | 90.8 |
| 9.3 | −0.1 | 100.2 |
| 9.4 | −0.8 | 101.7 |

From the above results it is seen that pretreatment with polymeric inhibitors containing Si(OR)$_3$ groups are useful for the pretreatment process of the present invention in high solids processes.

Example 10—Inhibitor Structure Variation for Single Stream (High Solids) Process Example 10 illustrates a variety of polymeric compounds containing —Si(OR)$_3$ groups can be used in a pretreatment process according to the present invention for single stream applications with high solids (red mud solids).

For each of the pretreatment runs of Examples 10.1 and 10.2, the pretreatment liquor was no-Si SBL with a pH of 13.5. The bomb was treated with each solution for 16 hours at a temperature of 100° C. The scaling run results were compared against a bomb treated with a pretreatment liquor of no-Si SBL containing no scale inhibitor and then subjected to three scaling runs.

The inhibitor solution containing a polymer containing —Si(OR)$_3$ groups of Example 10.1 was prepared by dissolving 2.02 g of polyethylene glycol diglycidyl ether (PEG 400-DGE) in 15.93 g water and then adding. 0.8599 g 3-(aminopropyl)trimethoxysilane. The solution was stirred at 70° C. for 30 min to form a solid gel. Aqueous NaOH solution (2 wt %) was then added to the gel to make a 5.9 wt % active solution, wherein the activity value of 5.9% is based on the weight of the gel (unhydrolyzed compound). 30 ml no-Si SBL was added to the bomb followed by 508 μl of this 5.9% w/w inhibitor solution to create a 1000 mg/l inhibitor solution for pretreatment of the bomb (1 μl=1 mg).

The inhibitor solution containing a polymer containing —Si(OR)$_3$ groups of Example 10.2 was prepared by dissolving 20 g of Ethyleneamine E-100 (a mixture of tetraethylenepentamine (TEPA), pentaethylenehexamine (PEHA) and hexaethyleneheptamine (HEHA) with a number-average molecular weight of 250-300 g/mole; available from Huntsman, The Woodlands, Tex.) in 50 g water, cooling to 0° C. in an ice bath, and then adding 15.5 g epichlorohydrin followed by 13.4 g of 50 wt % NaOH. The solution was kept at reflux for 1 hour before cooling to room temperature and adding 40 g water and 14 g 50 wt % NaOH, followed by addition of 6.8 g 3-(glycidoxypropyl)trimethoxysilane. The mixture was stirred overnight at room temperature. Aqueous NaOH solution (2 wt %) was then added to the solid polymer to make a 5.0 wt % active solution, wherein the activity value of 5.0% is based on the weight of the unhydrolyzed compound. 30 ml no-Si SBL was added to the bomb followed by 600 μl of this 5.0% w/w inhibitor solution to create a 1000 mg/l inhibitor solution for pretreatment of the bomb (1 μl=1 mg).

For each of the scaling runs of Examples 10.1 and 10.2, the scaling run liquor was SBL containing red mud solids present in an amount of 400 mg/l. The scaling tests were run at a temperature of 150° C. for 1.25 hours. The pH of the blank pretreatment liquor and that of the pretreatment inhibitors was 13.5. Three scaling runs were performed for each test. The reduction in wall scale for each Example was compared against the blank—a bomb pretreated with no-Si SBL containing no inhibitor. The results are provided in Table 10.

TABLE 10

Example 10 Scaling Run Results

| Test # | Wall scale amount (mgs) | % reduction in wall scale |
|---|---|---|
| Blank | 46.4 | N/A |
| 10.1 | 87.4 | −88.4 |
| 10.2 | 26.0 | 44.0 |

From the above results it is seen that pretreatment with polymeric inhibitors containing Si(OR)$_3$ groups are useful for the pretreatment process of the present invention. However, polymeric inhibitors containing no hydrophobe (Example 10.1) are not successful in inhibiting scale in the operating conditions (synthetic Bayer liquor with solids) of this Example.

Example 11—Inhibitor Structure Variation for Single Stream (High Solids) Process Example 11 illustrates the effect of various polymeric compounds in a pretreatment process according to the present invention for single stream applications with high solids (red mud solids).

For each of the pretreatment runs of Examples 11.1-11.4, the pretreatment liquor was no-Si SBL with a pH of 13.5. The bomb was treated with each solution for 16 hours at a temperature of 100° C. The scaling run results were compared against a bomb treated with a pretreatment liquor of no-Si SBL containing no scale inhibitor, and then subjected to three scaling runs.

The inhibitor solution of Example 11.1 containing no hydrophobe was prepared by dissolving 4 g Ethyleneamine E-100 (Huntsman, The Woodlands, Tex.) and 2.3 g bis (hexamethylene)triamine in 50 g water, cooling to 3° C. in an ice bath, and then adding 5.33 g epichlorohydrin followed by 3.4667 g 50 wt % NaOH. The solution was stirred at 28° C. for 20 min and then kept at reflux for 1 hour before cooling to room temperature, resulting in a solid gel. 30.1 g of the gel was mixed with 3 g 50 wt % NaOH and 80 g water, followed by stirring overnight at room temperature to get a viscous solution. Then 2.49 g of 3-glycidoxypropyl) trimethoxysilane was added to the viscous solution, followed by stirring overnight at room temperature. Aqueous NaOH solution (2 wt %) was then added to the gel to make a 5.0 wt % active solution, wherein the activity value of 5.0% is based on the weight of the gel (unhydrolyzed compound). 30 ml no-Si SBL was added to the bomb followed by 600 µl of this 5.0% w/w inhibitor solution to create a 1000 mg/l inhibitor solution for pretreatment of the bomb (1 µl=1 mg).

The inhibitor solution containing low (1%) hydrophobe of Example 11.2 was prepared by heating 1.8483 g of polyethyleneimine (Lupasol® WF, BASF, Germany) to 100° C. and then adding 0.1188 g glycidyl 4-nonylphenylether and 0.4064 g 3-(glycidoxypropyl)trimethoxysilane with stirring. Stirring was continued for 10 minutes to form a solid gel, which was then heated at 100° C. for 16 hour. Aqueous NaOH solution (2 wt %) was then added to the gel to make a 5.0 wt % active solution, wherein the activity value of 5.0% is based on the weight of the gel (unhydrolyzed compound). 30 ml no-Si SBL was added to the bomb followed by 600 µl of this 5.0% w/w inhibitor solution to create a 1000 mg/l inhibitor solution for pretreatment of the bomb (1 µl=1 mg).

The inhibitor solution containing —Si(OR)$_2$ groups of Example 11.3 was prepared by mixing 5.00 g of polyethyleneimine (Lupasol® WF from BASF, Germany) in 5.00 g of ethanol, and then adding 1.09 g of glycidyloxypropylmethyldimethoxysilane and 0.32 g of glycidyl 4-nonylphenylether. The mixture was stirred at 60° C. for 1 hour. Aqueous NaOH solution (2 wt %) was then added to the gel to make a 5.0 wt % active solution, wherein the activity value of 5.0% is based on the weight of the gel (unhydrolyzed compound). 30 ml no-Si SBL was added to the bomb followed by 600 µl of this 5.0% w/w inhibitor solution to create a 1000 mg/l inhibitor solution for pretreatment of the bomb (1 µl=1 mg).

The inhibitor solution containing —Si(OR)$_3$ groups of Example 11.4 was prepared by dissolving 12.12 g of styrene/maleic anhydride copolymer (SMA) in 120 mL dimethylformamide (DMF) at 50° C. A solution of 2.718 g diethylamine, 1.608 g tallow amine, and 3.714 g (3-aminopropyl) trimethoxysilane was added into 18 ml of the above DMF solution slowly under agitation. The resultant DMF solution was heated at 100° C. for 2 hours before cooling to room temperature. The cooled DMF solution was poured into 3000 ml ethyl acetate slowly under agitation to precipitate out SMA polymer as a white solid powder. The powder was filtered, washed with cold ethyl acetate, and dried under vacuum overnight. Aqueous NaOH solution (2 wt %) was then added to the dried white solid polymer to make a 2.0 wt % active solution, wherein the activity value of 2.0% is based on the weight of the solid polymer. 30 ml no-Si SBL was added to the bomb followed by 1500 µl of this 2.0% w/w inhibitor solution to create a 1000 mg/l inhibitor solution for pretreatment of the bomb (1 µl=1 mg).

For each of the scaling runs of Examples 11.1-11.4, the scaling run liquor was SBL containing red mud solids present in an amount of 400 mg/l. The scaling tests were run at a temperature of 150° C. for 1.25 hours. The pH of the blank pretreatment liquor and that of the pretreatment inhibitors was 13.5. Three scaling runs were performed for each test. The reduction in wall scale for each Example was compared against the blank—a bomb pretreated with no-Si SBL containing no inhibitor. The results are provided in Table 11.

TABLE 11

Example 11 Scaling Run Results

| Test # | Wall scale amount (mgs) | % reduction in wall scale |
|---|---|---|
| Blank | 45.9 | N/A |
| 11.1 | 55.8 | −21.6 |
| 11.2 | 65.4 | −42.5 |
| 11.3 | 79.2 | −72.5 |
| 11.4 | 27.0 | 41.3 |

From the above results it is seen that pretreatment with polymeric inhibitors containing Si(OR)$_3$ groups are useful for the pretreatment process of the present invention, whereas polymeric inhibitors containing no hydrophobes or low hydrophobes (e.g., Example 11.2), Si(OR)$_2$ groups (e.g., Example 11.3) or low Si(OR)$_2$ groups (e.g., Example 11.2) actually increase scale formation.

Example 12—Inhibitor Structure Variation for Single Stream (High Solids) Process Example 12 illustrates the effect of small molecule compounds in a pretreatment process according to the present invention for single stream applications with high solids (red mud solids).

For each of the pretreatment runs of Examples 12.1-12.10, the bomb was treated with each solution for 16 hours at a temperature of 100° C. The scaling run results were compared against a bomb treated with a pretreatment liquor of deionized water and NaOH salt containing no red mud solids and no scale inhibitor and then subjected to three scaling runs.

For the inhibitor solution of Example 12.1, 30 ml no-Si SBL was added to the bomb followed by 600 µl of a 5.0% w/w inhibitor solution of small molecule Compound 6A (described above) to create a 1000 mg/l inhibitor solution for pretreatment of the bomb (1 µl=1 mg).

For the inhibitor solution of Example 12.2, 30 ml no-Si SBL was added to the bomb followed by 600 μl of a 5.0% w/w inhibitor solution of small molecule Compound 6B (described above) to create a 1000 mg/l inhibitor solution for pretreatment of the bomb (1 μl=1 mg).

For the inhibitor solution of Example 12.3, 30 ml of deionized water was added to the bomb followed by 600 μl of a 5.0% w/w inhibitor solution of Compound 6A (described above) to create a 1000 mg/l inhibitor solution with a pH of 11.2 for pretreatment of the bomb (1 μl=1 mg).

For the inhibitor solution of Example 12.4, 30 ml of deionized water was added to the bomb followed by 600 μl of a 5.0% w/w inhibitor solution of Compound 6B (described above) to create a 1000 mg/l inhibitor solution with a pH of 11.2 for pretreatment of the bomb (1 μl=1 mg).

For the inhibitor solution of Example 12.5, 2.84 g of 2 wt % NaOH was added to 47.16 g DI water to create a solution having a pH of 12.0. 30 ml of this solution was added to the bomb followed by 600 μl of a 5.0% w/w inhibitor solution of Compound 6A (described above) to create a 1000 mg/l inhibitor solution with a pH of 12.0 for pretreatment of the bomb (1 μl=1 mg).

For the inhibitor solution of Example 12.6, 2.84 g of 2 wt % NaOH was added to 47.16 g DI water to create a solution having a pH of 12.0. 30 ml of this solution was added to the bomb followed by 600 μl of a 5.0% w/w inhibitor solution of Compound 6B (described above) to create a 1000 mg/l inhibitor solution with a pH of 12.1 for pretreatment of the bomb (1 μl=1 mg).

For the inhibitor solution of Example 12.7, 1.48 g of 26 wt % NaOH was added to 48.52 g DI water to create a solution having a pH of 13.0. 30 ml of this solution was added to the bomb followed by 600 μl of a 5.0% w/w inhibitor solution of Compound 6A (described above) to create a 1000 mg/l inhibitor solution with a pH of 13.0 for pretreatment of the bomb (1 μl=1 mg).

For the inhibitor solution of Example 12.8, 1.65 g of 26 wt % NaOH was added to 48.35 g DI water to create a solution having a pH of 13.0. 30 ml of this solution was added to the bomb followed by 600 μl of a 5.0% w/w inhibitor solution of Compound 6B (described above) to create a 1000 mg/l inhibitor solution with a pH of 13.0 for pretreatment of the bomb (1 μl=1 mg).

For the inhibitor solution of Example 12.9, 7.50 g of sodium sulfate ($Na_2SO_4$) was dissolved in 42.09 g of DI water, followed by addition of 0.41 g of 26 wt % NaOH to create a solution having a pH of 13.0. 30 ml of this solution was added to the bomb followed by 600 μl of a 5.0% w/w inhibitor solution of Compound 6A (described above) to create a 1000 mg/l inhibitor solution with a pH of 13.0 for pretreatment of the bomb (1 μl=1 mg).

For the inhibitor solution of Example 12.10, 7.50 g of sodium sulfate ($Na_2SO_4$) was dissolved in 42.09 g of DI water, followed by addition of 0.41 g of 26 wt % NaOH to create a solution having a pH of 13.0. 30 ml of this solution was added to the bomb followed by 600 μl of a 5.0% w/w inhibitor solution of Compound 6B (described above) to create a 1000 mg/l inhibitor solution with a pH of 13.0 for pretreatment of the bomb (1 μl=1 mg).

For each of the scaling runs of Examples 12.1-12.10, the scaling run liquor was SBL containing red mud solids present in an amount of 400 mg/l. The scaling tests were run at a temperature of 150° C. for 1.25 hours. Three scaling runs were performed for each test. The reduction in wall scale for each Example was compared against the blank—a bomb pretreated with deionized water and salt (NaOH) containing no inhibitor. The results are provided in Table 12.

TABLE 12

Example 12 Scaling Run Results

| Test # | Pretreatment liquor pH | Wall scale amount (mgs) | % reduction in wall scale |
|---|---|---|---|
| Blank | 13.0 | 60.6 | N/A |
| 12.1 | 13.5 | 37.5 | 38.1 |
| 12.2 | 13.5 | 37.3 | 38.4 |
| 12.3 | 11.2 | 78.2 | −29.0 |
| 12.4 | 11.2 | 39.6 | 34.7 |
| 12.5 | 12 | 78.3 | −29.2 |
| 12.6 | 12.1 | 27.6 | 54.5 |
| 12.7 | 13 | 59.0 | 2.6 |
| 12.8 | 13 | 40.3 | 33.5 |
| 12.9 | 13 | 60.2 | 0.7 |
| 12.10 | 13 | 51.9 | 14.4 |

From the above results it is seen that pretreatment with small molecule inhibitors are somewhat useful (i.e., show some slight or moderate scale inhibition) for the pretreatment process of the present invention when used in a pretreatment liquor containing dissolved salts, or when the pretreatment liquor has a pH of about 11.0 or higher. Optimization of the liquor pH and/or salt concentration is required for best performance. Examples 12.1 and 12.2 show that small molecule compounds 6A and 6B inhibit scale in the presence of red mud solids when used in a process according to the present invention. When the same molecules are used with no salt (deionized water solution, Examples 12.3 and 12.5, Compound 6A), the pretreatment compositions fail at inhibiting scale under these operating conditions.

Example 13—Inhibitor Structure Variation in Various Salt Process Solutions

Example 13 illustrates the effect of an inhibitor containing an —$Si(OR)_3$ group in a pretreatment process according to the present invention for double stream applications with low solids (no red mud solids).

For the pretreatment runs of Example 13.1, the bomb was treated with the solution for 16 hours at a temperature of 100° C. The scaling run results were compared against a bomb treated with a pretreatment liquor of deionized water and NaOH salt containing no scale inhibitor and then subjected to three scaling runs. For the blank pretreatment, 3.23 g of 0.5 wt % NaOH was added to 49.0 g deionized water to create a solution having a pH of 12.0. A 30 ml portion of this blank was added to the bomb.

For the inhibitor solution of Example 13.1, 30 ml of the blank solution was added to the bomb followed by 600 μl of a 5.0% w/w inhibitor solution of 2A (described above) to create a 1000 mg/l inhibitor solution for pretreatment of the bomb (1 μl=1 mg).

For each of the scaling runs of Example 13.1, the scaling run liquor was SBL containing no red mud solids. The scaling tests were run at a temperature of 150° C. for 1.25 hours. Three scaling runs were performed for each test. The reduction in wall scale for Example 13.1 was compared against the blank—a bomb pretreated with deionized water and salt (NaOH) containing no inhibitor. The results are provided in Table 13.

TABLE 13

Example 13 Scaling Run Results

| Test # | Pretreatment liquor pH | Wall scale amount (mgs) | % reduction in wall scale |
|---|---|---|---|
| Blank | 12.0 | 72.7 | N/A |
| 13.1 | 12.0 | 17.1 | 76.5 |

From the above results it is seen that pretreatment liquor preferably has a pH of 11.0 or greater when no additional salts other than NaOH are present. NaOH concentration at a pH of 11.0 is calculated at 0.04 g/l, or about 0.004% when the pH of the pretreatment liquor is at or greater than about 11.0. NaOH concentration at a pH of 12.0 is calculated at about 0.04%.

Example 14—Inhibitor Structure Variation in Salt Process Solutions

Example 14 illustrates the effect of an inhibitor containing an —Si(OR)$_3$ group in a pretreatment process according to the present invention for double stream applications with low solids (no red mud solids).

For the pretreatment runs of Examples 14.1 and 14.2, the bomb was treated with the solution for 16 hours at a temperature of 100° C. The scaling run results were compared against a bomb treated with a pretreatment liquor of deionized water and NaOH salt containing no scale inhibitor and then subjected to three scaling runs. For the blank pretreatment, 3.92 g of 0.5 wt % NaOH was added to 46.08 g deionized water to create a solution having a pH of 12.0. A 30 ml portion of this blank was added to the bomb.

For the inhibitor solution of Example 14.1, 4.64 g of 0.50 wt % NaOH was added to 45.36 g DI water with stirring to achieve a measured pH of 12.0. 30 ml of this solution was added to the bomb followed by 600 μl of a 5.0% w/w inhibitor solution of 2A (described above) to create a 100 mg/l inhibitor solution for pretreatment of the bomb (1 μl=1 mg).

For the inhibitor solution of Example 14.2, 3.48 g of 0.5% NaOH was added to 46.52 g DI water with stirring to achieve a measured pH of 12.0. 30 ml of this solution was added to the bomb followed by 150 μl of a 5.0% w/w inhibitor solution of 2A (described above) to create a 250 mg/l inhibitor solution for pretreatment of the bomb (1 μl=1 mg).

For each of the scaling runs of Example 14.1 and 14.2, the scaling run liquor was SBL containing no red mud solids. The scaling tests were run at a pH of 12.0 and a temperature of 150° C. for 1.25 hours. Three scaling runs were performed for each test. The reduction in wall scale for Example 14 was compared against the blank—a bomb pretreated with deionized water and salt (NaOH) containing no inhibitor. The results are provided in Table 14.

TABLE 14

Example 14 Scaling Run Results

| Test # | Pretreatment liquor pH | Wall scale amount (mgs) | % reduction in wall scale |
|---|---|---|---|
| Blank | 12.0 | 56.1 | N/A |
| 14.1 | 12.0 | 17.5 | 68.8 |
| 14.2 | 12.0 | 6.4 | 88.6 |

From the above results it is seen that pretreatment liquor preferably has a pH of 11.0 or greater when no additional salts other than NaOH are present. NaOH concentration at a pH of 11.0 is calculated at 0.04 g/l, or about 0.004% when the pH of the pretreatment liquor is at or greater than 11.0. Therefore, when the salt concentration is about 0.004% or greater or the pH of the pretreatment liquor is about 11.0 or greater, pretreatment with compounds according to the present invention is suitable in reducing wall scale formation.

Example 15—Effect on Inhibition in Various Salt Process Solutions and pH

Example 15 illustrates the effect of an inhibitor containing an —Si(OR)$_3$ group in various salt concentrations and various pH in a pretreatment process according to the present invention for double stream applications with low solids (no red mud solids).

For the pretreatment runs of Examples 15.1-15.7, the bomb was treated with the solution for 16 hours at a temperature of 100° C. The scaling run results were compared against a bomb that was not treated with any pretreatment liquor (i.e., the bomb was only mechanically cleaned), and then subjected to three scaling runs.

For the inhibitor solution of Example 15.1, 8.77 g of 0.5% NaOH was added to 41.23 g DI water with stirring to achieve a measured pH of 12.0. 30 ml of this solution was added to the bomb followed by 150 μl of a 5.0% w/w inhibitor solution of 2A (described above) to create a 250 mg/l inhibitor solution for pretreatment of the bomb (1 μl=1 mg).

For the inhibitor solution of Example 15.2, 0.05 g of sodium sulfate was added to 44.82 g DI water with stirring to dissolve the solid, followed by addition of 5.13 g of 0.5 wt % NaOH and 2.56 g of 2 wt % NaOH to achieve a measured pH of 12.0. 30 ml of this solution was added to the bomb followed by 150 μl of a 5.0% w/w inhibitor solution of 2A (described above) to create a 250 mg/l inhibitor solution for pretreatment of the bomb (1 μl=1 mg).

For the inhibitor solution of Example 15.3, 0.050 g of sodium sulfate was added to 40.00 g DI water with stirring, followed by addition of 9.95 g of 50 wt % NaOH to achieve a measured pH of 13.3. 30 ml of this solution was added to the bomb followed by 150 μl of a 5.0% w/w inhibitor solution of 2A (described above) to create a 250 mg/l inhibitor solution for pretreatment of the bomb (1 μl=1 mg).

For the inhibitor solution of Example 15.4, 0.50 g of sodium sulfate was added to 44.90 g DI water with stirring to dissolve the solid, followed by addition of 4.60 g of 0.5 wt % NaOH to achieve a measured pH of 12.0. 30 ml of this solution was added to the bomb followed by 150 μl of a 5.0% w/w inhibitor solution of 2A (described above) to create a 250 mg/l inhibitor solution for pretreatment of the bomb (1 μl=1 mg).

For the inhibitor solution of Example 15.5, 0.50 g of sodium sulfate was added to 40.21 g DI water with stirring to dissolve the solid, followed by addition of 9.29 g of 50 wt % NaOH to achieve a measured pH of 13.3. 30 ml of this solution was added to the bomb followed by 150 μl of a 5.0% w/w inhibitor solution of 2A (described above) to create a 250 mg/l inhibitor solution for pretreatment of the bomb (1 μl=1 mg).

For the inhibitor solution of Example 15.6, 5.00 g of sodium sulfate was added to 41.10 g DI water with stirring to dissolve the solid, followed by addition of 3.90 g of 0.5 wt % NaOH to achieve a measured pH of 12.0. 30 ml of this solution was added to the bomb followed by 150 μl of a 5.0% w/w inhibitor solution of 2A (described above) to create a 250 mg/l inhibitor solution for pretreatment of the bomb (1 μl=1 mg).

For the inhibitor solution of Example 15.7, 5.00 g of sodium sulfate was added to 37.62 g DI water with stirring to dissolve the solid, followed by addition of 7.38 g of 50 wt % NaOH to achieve a measured pH of 13.3. 30 ml of this solution was added to the bomb followed by 150 μl of a 5.0% w/w inhibitor solution of 2A (described above) to create a 250 mg/l inhibitor solution for pretreatment of the bomb (1 μl=1 mg).

For each of the scaling runs of Example 15.1-15.7, the scaling run liquor was SBL containing no red mud solids. The scaling tests were run at a temperature of 150° C. for 1.25 hours. Three scaling runs were performed for each test. The reduction in wall scale for Example 15 was compared against the blank—a bomb only mechanically cleaned. The results are provided in Table 15.

TABLE 15

Example 15 Scaling Run Results

| Test # | Pretreatment liquor pH | Wall scale amount (mgs) | % reduction in wall scale |
|---|---|---|---|
| Blank | 12.0 | 48.3 | N/A |
| 15.1 | 12.0 | 37.6 | 22.2 |
| 15.2 | 12.0 | 7.5 | 84.5 |
| 15.3 | 13.3 | 49.3 | -2.1 |
| 15.4 | 12.0 | 1.1 | 97.7 |
| 15.5 | 13.3 | 47.1 | 2.5 |
| 15.6 | 12.0 | 9.4 | 80.5 |
| 15.7 | 13.3 | 36.9 | 23.6 |

Examples 15.2-15.7 show that sodium sulfate can be used in the pretreatment liquor at various concentrations from about 0.1% to about 10.0% wt/wt. Example 15.1 shows that when the pH of the pretreatment liquor is about 12.0 or greater and no additional salts other than NaOH are present, scale inhibition is observed.

Example 16—Effect on Inhibition in Various Salt Process Solutions and pH

Example 16 illustrates the effect of an inhibitor containing an —Si(OR)$_3$ group in various salt concentrations in a pretreatment process according to the present invention for double stream applications with low solids (no red mud solids).

For the pretreatment runs of Examples 16.1-16.4, the bomb was treated with the inhibitor solution for 16 hours at a temperature of 100° C. The scaling run results were compared against a bomb that was treated with a pretreatment liquor prepared by adding 1.55 g of 50 wt % NaOH to 48.45 g DI water with stirring to achieve a measured pH of 13.2. A 30 ml portion of this solution was added to the bomb (blank), and then subjected to three scaling runs.

For the inhibitor solution of Example 16.1, 1.25 g of 50.0% NaOH was added to 48.75 g DI water with stirring to achieve a measured pH of 13.1. 30 ml of this solution was added to the bomb. A 5% w/w stock solution of inhibitor 2A was diluted 10-fold using 2 wt % NaOH to make a 0.5% w/w solution of 2A (described above). 600 μl of the 0.5% w/w inhibitor solution of 2A was added to the solution in the bomb to create a 100 mg/l inhibitor solution for pretreatment of the bomb (1 μl=1 mg).

For the inhibitor solution of Example 16.2, 1.24 g of 50% NaOH was added to 48.76 g DI water with stirring to achieve a measured pH of 13.1. 30 ml of this solution was added to the bomb followed by 150 μl of the 5% w/w stock solution of inhibitor 2A to create a 250 mg/l inhibitor solution for pretreatment of the bomb (1 μl=1 mg).

For Example 16.3, 7.50 g of sodium sulfate was added to 42.04 g DI water with stirring to dissolve the solid, followed by addition of 0.46 g of 50% NaOH to achieve a measured pH of 13.1. The sodium sulfate concentration was about 15 wt/wt %. 30 ml of this solution was added to the bomb. A 5% w/w stock solution of inhibitor 2A was diluted 10-fold using 2 wt % NaOH to make a 0.5% w/w solution of 2A (described above). 600 μl of the 0.5% w/w inhibitor solution of 2A was added to the solution in the bomb to create a 100 mg/l inhibitor solution for pretreatment of the bomb (1 μl=1 mg).

For Example 16.4, 7.50 g of sodium sulfate was added to 41.83 g DI water with stirring, and then 0.67 g of 50% NaOH added to achieve a measured pH of 13.2. The sodium sulfate concentration was about 15 wt/wt %. 30 ml of this solution was added to the bomb followed by 150 μl of the 5% w/w stock solution of inhibitor 2A to create a 250 mg/l inhibitor solution for pretreatment of the bomb (1 μl=1 mg).

For each of the scaling runs of Example 16.1-16.4, the scaling run liquor was SBL containing no red mud solids. The scaling tests were run at a temperature of 150° C. for 1.25 hours. Three scaling runs were performed for each test. The reduction in wall scale for Example 16 was compared against the blank. The results are provided in Table 16.

TABLE 16

Example 16 Scaling Run Results

| Test # | Pretreatment liquor pH | Wall scale amount (mgs) | % reduction in wall scale |
|---|---|---|---|
| Blank | 13.2 | 69.5 | N/A |
| 16.1 | 13.1 | 62.8 | 9.6 |
| 16.2 | 13.1 | 54.3 | 21.9 |
| 16.3 | 13.1 | 8.0 | 88.5 |
| 16.4 | 13.2 | 4.7 | 93.2 |

Examples 16.3 and 16.4 show that sodium sulfate can be used in the pretreatment liquor. Examples 16.1 and 16.2 show that pH of the pretreatment liquor is about 11.0 or greater when no additional salts other than NaOH are present.

Example 17—Effect on Inhibition in Various Salt Process Solutions and pH

Example 17 illustrates the effect of an inhibitor containing an —Si(OR)$_3$ group in various salt concentrations in a pretreatment process according to the present invention for double stream applications with low solids (no red mud solids).

For the pretreatment runs of Examples 17.1-17.8, the bomb was treated with the inhibitor solution for 16 hours at a temperature of 100° C. The scaling run results were compared against a bomb that was treated with pretreatment liquor prepared by adding 1.02 g of 50 wt % NaOH to 48.98 g DI water with stirring to achieve a measured pH of 13.0. A 30 ml portion of this solution was added to the bomb without any scale inhibitor (blank), and then subjected to three scaling runs.

For the inhibitor solution of Example 17.1, 1.00 g of 50% NaOH was added to 49.00 g DI water with stirring to achieve a measured pH of 13.0. 30 ml of this solution was added to the bomb, followed by the addition of 150 μl of the 5% w/w stock solution of inhibitor 2A to the solution in the bomb to create a 250 mg/l inhibitor solution for pretreatment of the bomb (1 μl=1 mg).

For the inhibitor solution of Example 17.2, 0.050 g of sodium carbonate ($Na_2CO_3$) was added to 48.93 g DI water with stirring to dissolve the solid (0.1% $Na_2CO_3$), followed by addition of 1.02 g of 50 wt % NaOH to achieve a measured pH of 13.1. 30 ml of this solution was added to the bomb, followed by addition of 150 μl of the 5% w/w stock solution of inhibitor 2A to the solution in the bomb to create a 250 mg/l inhibitor solution for pretreatment of the bomb (1 μl=1 mg).

For the inhibitor solution of Example 17.3, 0.50 g of sodium carbonate was added to 48.72 g DI water with stirring to dissolve the solid (1% $Na_2CO_3$), followed by addition of 0.68 g of 50 wt % NaOH to achieve a measured pH of 13.0. 30 ml of this solution was added to the bomb, followed by addition of 150 μl of the 5% w/w stock solution of inhibitor 2A to the solution in the bomb to create a 250 mg/l inhibitor solution for pretreatment of the bomb (1 μl=1 mg).

For the inhibitor solution of Example 17.4, 2.50 g of sodium carbonate was added to 47.03 g DI water with stirring to dissolve the solid (5% $Na_2CO_3$), followed by addition of 0.47 g of 50 wt % NaOH to achieve a measured pH of 13.0. 30 ml of this solution was added to the bomb, followed by addition of 150 μl of the 5% w/w stock solution of inhibitor 2A to the solution in the bomb to create a 250 mg/l inhibitor solution for pretreatment of the bomb (1 μl=1 mg).

For the inhibitor solution of Example 17.5, 5.00 g of sodium carbonate was added to 46.53 g DI water with stirring to dissolve the solid (10% $Na_2CO_3$), followed by addition of 0.47 g of 50 wt % NaOH to achieve a measured pH of 13.1. 30 ml of this solution was added to the bomb, followed by addition of 150 μl of the 5% w/w stock solution of inhibitor 2A to the solution in the bomb to create a 250 mg/l inhibitor solution for pretreatment of the bomb (1 μl=1 mg).

For the inhibitor solution of Example 17.6, 7.50 g of sodium carbonate was added to 42.27 g DI water with stirring to dissolve the solid (15% $Na_2CO_3$), followed by addition of 0.23 g of 50 wt % NaOH to achieve a measured pH of 13.0. 30 ml of this solution was added to the bomb, followed by addition of 150 μl of the 5% w/w stock solution of inhibitor 2A to the solution in the bomb to create a 250 mg/l inhibitor solution for pretreatment of the bomb (1 μl=1 mg).

For the inhibitor solution of Example 17.7, 0.50 g of sodium phosphate ($Na_3PO_4$) was added to 48.35 g DI water with stirring to dissolve the solid (1% $Na_3PO_4$), followed by addition of 1.15 g of 50 wt % NaOH to achieve a measured pH of 13.1. 30 ml of this solution was added to the bomb, followed by addition of 150 μl of the 5% w/w stock solution of inhibitor 2A to the solution in the bomb to create a 250 mg/l inhibitor solution for pretreatment of the bomb (1 μl=1 mg).

For the inhibitor solution of Example 17.8, 7.50 g of sodium phosphate ($Na_3PO_4$) was added to 42.15 g DI water with stirring to dissolve the solid (15% $Na_3PO_4$), followed by addition of 0.35 g of 50 wt % NaOH to achieve a measured pH of 13.2. 30 ml of this solution was added to the bomb, followed by addition of 150 μl of the 5% w/w stock solution of inhibitor 2A to the solution in the bomb to create a 250 mg/l inhibitor solution for pretreatment of the bomb (1 μl=1 mg).

For each of the scaling runs of Example 17.1-17.8, the scaling run liquor was SBL containing no red mud solids. The scaling tests were run at a temperature of 150° C. for 1.25 hours. Three scaling runs were performed for each test. The reduction in wall scale for Example 17 was compared against the blank. The results are provided in Table 17.

TABLE 17

| Example 17 Scaling Run Results | | | |
|---|---|---|---|
| Test # | Pretreatment liquor pH | Wall scale amount (mgs) | % reduction in wall scale |
| Blank | 13.0 | 70.8 | N/A |
| 17.1 | 13.0 | 48.6 | 31.4 |
| 17.2 | 13.1 | 53.0 | 25.1 |
| 17.3 | 13.0 | 46.4 | 34.5 |
| 17.4 | 13.0 | 39.8 | 43.8 |
| 17.5 | 13.1 | 3.9 | 94.5 |
| 17.6 | 13.0 | −0.9 | 101.3 |
| 17.7 | 13.1 | 61.8 | 12.7 |
| 17.8 | 13.1 | 33.9 | 52.1 |

Examples 17.2-17.8 show that a variety of salts, including sodium hydroxide, sodium carbonate and sodium phosphate can be used in the pretreatment liquor. Example 17.1 shows that when the pH of the pretreatment liquor is about 13.0 or greater and no additional salts other than NaOH are present, scale inhibition is observed.

Example 18—Effect of Variation on Pretreatment Temperature

Example 18 illustrates the effect of application of an inhibitor containing an —Si(OR)$_3$ group as a pretreatment at various temperatures in a pretreatment process according to the present invention for double stream applications with lows solids content (no red mud solids).

For the pretreatment runs of Examples 18.1-18.3, the bomb was treated with the inhibitor solution for 4 hours at temperatures of 25° C. (Example 18.1), 100° C. (Example 18.2) and 150° C. (Example 18.3). The scaling run results were compared against a bomb that was not treated with any pretreatment liquor (i.e., a blank bomb that was only mechanically cleaned), and then subjected to three scaling runs.

For the inhibitor solution of Examples 18.1-18.3, the same inhibitor solution was used—a 5.0% w/w inhibitor solution of 2A (described above). 30 ml of no-Si SBL was added to the bomb followed by 600 μl of the 5.0% w/w inhibitor solution of 2A to create a 1000 mg/inhibitor solution for pretreatment of the bomb (1 μl=1 mg).

For each of the scaling runs of Example 18.1-18.3, the scaling run liquor was SBL containing no red mud solids. The scaling tests were run at a temperature of 150° C. for 1.25 hours. Three scaling runs were performed for each test. The reduction in wall scale for Example 18 was compared against the blank. The results are provided in Table 18.

TABLE 18

Example 18 Scaling Run Results

| Test # | Pretreatment liquor pH | Wall scale amount (mgs) | % reduction in wall scale |
|---|---|---|---|
| Blank | N/A | 62.4 | N/A |
| 18.1 | 13.5 | 42.1 | 32.5 |
| 18.2 | 13.5 | 4.3 | 93.1 |
| 18.3 | 13.5 | 1.7 | 97.3 |

Examples 18.1-18.3 show that a variety of temperatures as low as 25° C. to as high as 150° C. can be used for the pretreatment process.

While the invention has been described with what are presently considered the preferred embodiments, it is to be understood that the invention is not limited to the disclosed embodiments, but is intended to cover various modifications and equivalent arrangements included within the scope of the appended claims, and that the invention also contemplates multiply dependent embodiments of the appended claims where appropriate.

What is claimed is:

1. A method for reducing aluminosilicate containing scale in a Bayer process, comprising:
    identifying a Bayer process equipment surface that is subject to scale formation during the Bayer process;
    contacting the identified Bayer process equipment surface with an amount of a scale inhibiting composition effective to form a treated surface that is more resistant to scale formation upon subsequent contact with a Bayer process stream than an otherwise comparable untreated surface,
    wherein the scale inhibiting composition comprises a liquor comprising an aqueous solution of one or more water-soluble salts having at least about 0.004 wt/wt % or more of total dissolved salts or a liquor having a pH of about 11.0 or greater, the scale inhibiting composition further comprising a silicon-containing compound, wherein the silicon-containing compound is a polymer or a polymeric reaction product comprising a unit of Formula (I) and a unit of Formula (II)—

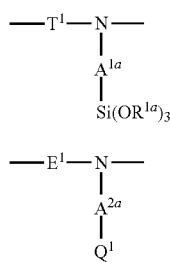

wherein
    $T^1$ and $E^1$ are each independently a first optionally substituted hydrocarbyl radical comprising from about 2 to about 40 carbons;
    $Q^1$ is H or a second optionally substituted hydrocarbyl radical comprising from about 1 to about 20 carbons;
    $A^{1a}$ and $A^{2a}$ are each independently a direct bond or an organic connecting group comprising from about 1 to about 20 carbons;
    $R^{1a}$ is H, optionally substituted $C_1$-$C_{20}$ alkyl, optionally substituted $C_6$-$C_{12}$ aryl, optionally substituted $C_7$-$C_{20}$ aralkyl, optionally substituted $C_2$-$C_{20}$ alkenyl, Group I metal ion, Group II metal ion, or $NR^{2a}_4$, where each $R^{2a}$ is independently selected from H, optionally substituted $C_1$-$C_{20}$ alkyl, optionally substituted $C_6$-$C_{12}$ aryl, optionally substituted $C_7$-$C_{20}$ aralkyl, and optionally substituted $C_2$-$C_{20}$ alkenyl; and
    contacting the treated surface with the Bayer process stream,
    wherein $Q^1$ is chosen from butyl, 2-ethylhexyl, $C_{8-10}$ alkyl, phenyl, cresyl, nonylphenyl, cetyl, octenyl, and octadecyl.

2. A method for reducing aluminosilicate containing scale in a Bayer process, comprising:
    identifying a Bayer process equipment surface that is subject to scale formation during the Bayer process;
    contacting the identified Bayer process equipment surface with an amount of a scale inhibiting composition effective to form a treated surface that is more resistant to scale formation upon subsequent contact with a Bayer process stream than an otherwise comparable untreated surface;
    wherein the scale inhibiting composition comprises a liquor comprising an aqueous solution of one or more water-soluble salts having at least about 0.004 wt/wt % or more of total dissolved salts or a liquor having a pH of about 11.0 or greater, the scale inhibiting composition further comprising a silicon-containing compound; and
    contacting the treated surface with the Bayer process stream,
    wherein the silicon-containing compound is a reaction product of at least a polyamine, a first nitrogen-reactive compound, and a second nitrogen-reactive compound, wherein:
    the first nitrogen-reactive compound comprises a —Si$(OR^{1b})_3$ group and a nitrogen-reactive group, where $R^{1b}$ is H, optionally substituted $C_1$-$C_{20}$ alkyl, optionally substituted $C_6$-$C_{12}$ aryl, optionally substituted $C_7$-$C_{20}$ aralkyl, optionally substituted $C_2$-$C_{20}$ alkenyl, Group I metal ion, Group II metal ion, or $NR^{2b}_4$, each $R^{3b}$ being independently selected from H, optionally substituted $C_1$-$C_{20}$ alkyl, optionally substituted $C_6$-$C_{12}$ aryl, optionally substituted $C_7$-$C_{20}$ aralkyl, and optionally substituted $C_2$-$C_{20}$ alkenyl;
    the second nitrogen-reactive compound comprises a nitrogen-reactive group and does not contain a Si$(OR^{1b})_3$ group.

3. The method of claim 2 wherein the reaction product has a weight average molecular weight of at least about 500.

4. The method of claim 2 wherein the first nitrogen-reactive compound is chosen from glycidoxypropyltrimethoxysilane, glycidoxypropyltriethoxysilane and chloropropyltrimethoxysilane.

5. The method of claim 2, wherein the second nitrogen-reactive compound is chosen from alkylhalides, glycidoxy ethers and alkyl epoxides.

6. A method for reducing aluminosilicate containing scale in a Bayer process, comprising:
    identifying a Bayer process equipment surface that is subject to scale formation during the Bayer process;
    contacting the identified Bayer process equipment surface with an amount of a scale inhibiting composition effective to form a treated surface that is more resistant to scale formation upon subsequent contact with a Bayer process stream than an otherwise comparable untreated surface;

wherein the scale inhibiting composition comprises a liquor comprising an aqueous solution of one or more water-soluble salts having at least about 0.004 wt/wt % or more of total dissolved salts or a liquor having a pH of about 11.0 or greater, the scale inhibiting composition further comprising a silicon-containing compound; and contacting the treated surface with the Bayer process stream, wherein the silicon-containing compound comprises:

a first component having a general formula X or XI—

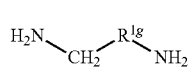

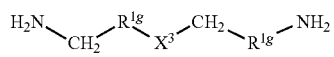

wherein $R^{1g}$ is independently $CH_2$, or $CH_2$—$CH_2$; and $X^3$ is NH, NH—$R^{1g}$—NH, or NH—$R^{1g}$—NH—$R^{1g}$—NH;

3-glycidoxypropyltrimethyloxysilane as a second component; and 2-ethylhexylglycidyl ether as a third component;

wherein synthesis of the compound proceeds by combining the first component with the 3-glycidoxypropyltrimethyloxysilane at a reactive hydrogen of the first component to form an intermediate, and the intermediate then reacted with the 2-ethylhexylglycidyl ether to form the silicon-containing compound.

7. A method for reducing aluminosilicate containing scale in a Bayer process, comprising:

identifying a Bayer process equipment surface that is subject to scale formation during the Bayer process;

contacting the identified Bayer process equipment surface with an amount of a scale inhibiting composition effective to form a treated surface that is more resistant to scale formation upon subsequent contact with a Bayer process stream than an otherwise comparable untreated surface;

wherein the scale inhibiting composition comprises a liquor comprising an aqueous solution of one or more water-soluble salts having at least about 0.004 wt/wt % or more of total dissolved salts or a liquor having a pH of about 11.0 or greater, the scale inhibiting composition further comprising a silicon-containing compound; and contacting the treated surface with the Bayer process stream, wherein the silicon-containing compound is a polymer having pendant thereto a group or end group according to Formula XII:

(XII)

wherein v is an integer of either 1 or 2; v+w=3; $R^{1b}$ is chosen from H, $C_1$-$C_{12}$ alkyl, aryl, Na, K, Li, and $NH_4$; and J is chosen from H and a hydrocarbon group having a number of carbons within the range of 1 to 20 carbons.

8. A method for reducing aluminosilicate containing scale in a Bayer process, comprising:

identifying a Bayer process equipment surface that is subject to scale formation during the Bayer process;

contacting the identified Bayer process equipment surface with an amount of a scale inhibiting composition effective to form a treated surface that is more resistant to scale formation upon subsequent contact with a Bayer process stream than an otherwise comparable untreated surface;

wherein the scale inhibiting composition comprises a liquor comprising an aqueous solution of one or more water-soluble salts having at least about 0.004 wt/wt % or more of total dissolved salts or a liquor having a pH of about 11.0 or greater, the scale inhibiting composition further comprising a silicon-containing compound having one or more —Si(OR)$_n$ groups;

wherein:

n is an integer from 1 to 3; and

R is H, optionally substituted $C_1$-$C_{20}$ alkyl, optionally substituted $C_6$-$C_{12}$ aryl, optionally substituted $C_7$-$C_{20}$ aralkyl, optionally substituted $C_2$-$C_{20}$ alkenyl, Group I metal ion, Group II metal ion, or $NR^1_4$; where each $R^1$ is independently chosen from H, optionally substituted $C_1$-$C_{20}$ alkyl, optionally substituted $C_6$-$C_{12}$ aryl, optionally substituted $C_7$-$C_{20}$ aralkyl, and optionally substituted $C_2$-$C_{20}$ alkenyl; and contacting the treated surface with the Bayer process stream, wherein the Bayer process stream comprises an amount of suspended solids in a range of about 0.01% to about 60% by weight, based on total weight of the Bayer process stream, wherein the solids are iron oxides.

9. A method for reducing aluminosilicate containing scale in a Bayer process, comprising:

identifying a Bayer process equipment surface that is subject to scale formation during the Bayer process;

contacting the identified Bayer process equipment surface with an amount of a scale inhibiting composition effective to form a treated surface that is more resistant to scale formation upon subsequent contact with a Bayer process stream than an otherwise comparable untreated surface;

wherein the scale inhibiting composition comprises a liquor comprising an aqueous solution of one or more water-soluble salts having at least about 0.004 wt/wt % or more of total dissolved salts or a liquor having a pH of about 11.0 or greater, the scale inhibiting composition further comprising a silicon-containing compound; and contacting the treated surface with the Bayer process stream, wherein the Bayer process stream comprises an amount of suspended solids in a range of about 0.01% to about 60% by weight, based on total weight of the Bayer process stream, wherein the silicon-containing compound is a polymer or polymeric reaction product comprising a unit of formula (I) and a unit of formula (II)—

-continued

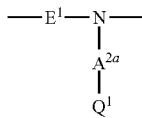
(II)

wherein
$T^1$ and $E^1$ are each independently a first optionally substituted hydrocarbyl radical comprising from about 2 to about 40 carbons;
$Q^1$ is a second optionally substituted hydrocarbyl radical comprising from about 1 to about 20 carbons;
$A^{1a}$ and $A^{2a}$ are each independently a direct bond or an organic connecting group comprising from about 1 to about 20 carbons;
$R^{1a}$ is H, optionally substituted $C_1$-$C_{20}$ alkyl, optionally substituted $C_6$-$C_{12}$ aryl, optionally substituted $C_7$-$C_{20}$ aralkyl, optionally substituted $C_2$-$C_{20}$ alkenyl, Group I metal ion, Group II metal ion, or $NR^{2a}_4$, where each $R^{2a}$ is independently chosen from H, optionally substituted $C_1$-$C_{20}$ alkyl, optionally substituted $C_6$-$C_{12}$ aryl, optionally substituted $C_7$-$C_{20}$ aralkyl, and optionally substituted $C_2$-$C_{20}$ alkenyl; and the polymer has a weight average molecular weight of at least about 500,
wherein the organic connecting groups $A^{1a}$ and $A^{2a}$ are each independently represented by -$A^{3a}$-$A^{4a}$-$A^{5a}$-$A^{6a}$-, wherein:
$A^{3a}$ is a direct bond, $NR^{3a}$ or O, where $R^{3a}$ is H or $C_{1-3}$ alkyl;
$A^{4a}$ is a direct bond, C=O, optionally substituted $C_1$-$C_{10}$ alkylene, or optionally substituted $C_6$-$C_{12}$ aryl;
$A^{5a}$ is a direct bond, O, $NR^{4a}$, amide, urethane or urea, where $R^{4a}$ is H or $C_{1-3}$ alkyl; and
$A^{6a}$ is a direct bond, O, optionally substituted $C_1$-$C_{20}$ alkyl, optionally substituted $C_2$-$C_{20}$ alkenyl or optionally substituted $C_7$-$C_{20}$ aralkyl;
wherein at least one of the organic connecting groups $A^{1a}$ and $A^{2a}$ is —$CH_2$—CH(OH)—$CH_2$—O— and optionally substituted C1-C10 alkylene, or optionally substituted C6-C12 aryl,
wherein $Q^1$ is chosen from butyl, 2-ethylhexyl, $C_{8-10}$ alkyl, phenyl, cresyl, nonylphenyl, cetyl, octenyl, and octadecyl.

10. A method for reducing aluminosilicate containing scale in a Bayer process, comprising:
identifying a Bayer process equipment surface that is subject to scale formation during the Bayer process;
contacting the identified Bayer process equipment surface with an amount of a scale inhibiting composition effective to form a treated surface that is more resistant to scale formation upon subsequent contact with a Bayer process stream than an otherwise comparable untreated surface;
wherein the scale inhibiting composition comprises a liquor comprising an aqueous solution of one or more water-soluble salts having at least about 0.004 wt/wt % or more of total dissolved salts or a liquor having a pH of about 11.0 or greater, the scale inhibiting composition further comprising a silicon-containing compound; and
contacting the treated surface with the Bayer process stream, wherein the Bayer process stream comprises an amount of suspended solids in a range of about 0.01% to about 60% by weight, based on total weight of the Bayer process stream,
wherein the silicon-containing compound is a reaction product of at least a polyamine, a first nitrogen-reactive compound, and a second nitrogen-reactive compound, the reaction product having a weight average molecular weight of at least about 500,
wherein:
the first nitrogen-reactive compound comprises a —Si$(OR^{1b})_3$ group and a nitrogen-reactive group, where $R^{1b}$ is H, optionally substituted $C_1$-$C_{20}$ alkyl, optionally substituted $C_6$-$C_{12}$ aryl, optionally substituted $C_7$-$C_{20}$ aralkyl, optionally substituted $C_2$-$C_{20}$ alkenyl, Group I metal ion, Group II metal ion, or $NR^{2b}_4$, each $R^{3b}$ being independently chosen from H, optionally substituted $C_1$-$C_{20}$ alkyl, optionally substituted $C_6$-$C_{12}$ aryl, optionally substituted $C_7$-$C_{20}$ aralkyl, and optionally substituted $C_2$-$C_{20}$ alkenyl; and
the second nitrogen-reactive compound comprises a nitrogen-reactive group and does not contain a $Si(OR^{1b})_3$ group.

11. The method of claim 10 wherein the first nitrogen-reactive compound is chosen from glycidoxypropyltrimethoxysilane glycidoxypropyltriethoxysilane and chloropropyl trimethoxysilane.

12. The method of claim 10 wherein the second nitrogen-reactive compound is chosen from dimethylsulfate, chlorooctane, chlorohexane, benzyl chloride, epichlorohydrin, glycidyl 4-nonylphenylether, butyl glycidyl ether, 2-ethylhexyl glycidyl ether, phenyl glycidyl ether, $C_{12}$-$C_{14}$ alkyl glycidyl ether, cresyl glycidyl ether, octenylsuccinic anhydride, $C_{8-10}$ alkyl halide, $C_{8-10}$ alkyl glycidyl ether and octadecenylsuccinic anhydride.

13. A method for reducing aluminosilicate containing scale in a Bayer process, comprising:
identifying a Bayer process equipment surface that is subject to scale formation during the Bayer process;
contacting the identified Bayer process equipment surface with an amount of a scale inhibiting composition effective to form a treated surface that is more resistant to scale formation upon subsequent contact with a Bayer process stream than an otherwise comparable untreated surface;
wherein the scale inhibiting composition comprises a liquor comprising an aqueous solution of one or more water-soluble salts having at least about 0.004 wt/wt % or more of total dissolved salts or a liquor having a pH of about 11.0 or greater, the scale inhibiting composition further comprising a silicon-containing compound having one or more —Si(OR)$_n$ groups;
wherein:
n is an integer from 1 to 3; and
R is H, optionally substituted $C_1$-$C_{20}$ alkyl, optionally substituted $C_6$-$C_{12}$ aryl, optionally substituted $C_7$-$C_{20}$ aralkyl, optionally substituted $C_2$-$C_{20}$ alkenyl, Group I metal ion, Group II metal ion, or $NR^1_4$; where each $R^1$ is independently chosen from H, optionally substituted $C_1$-$C_{20}$ alkyl, optionally substituted $C_6$-$C_{12}$ aryl, optionally substituted $C_7$-$C_{20}$ aralkyl, and optionally substituted $C_2$-$C_{20}$ alkenyl; and
contacting the treated surface with the Bayer process stream,
wherein the Bayer process stream comprises an amount of suspended solids in a range of about 0.01% to about 60% by weight, based on total weight of the Bayer process stream, wherein the silicon-containing compound comprises at least one compound having at least three components, one being a $R^{1f}$ component, one being a $R^{2f}$ component and one being a $R^{3f}$ component, the components within the compound arranged according to general Formula VII—

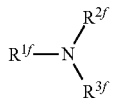
(VII)

wherein the compound is at least one of carbonates, bicarbonates, carbamates, ureas, amides and salts thereof; and
wherein $R^{1f}$ is chosen from H, alkyl, amine, alkylamine, structure (VIII) and Formula (IX)—

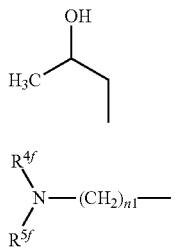
VIII

IX wherein $R^{2f}$ and $R^{4f}$ are independently chosen from H, alkyl, amine, alkylamine, GG and EE,
wherein GG is chosen from 3-glycidoxypropyltrimethoxysilane, 3-glycidoxypropyltrialkoxysilane, 3-glycidoxypropylalkyldialkoxysilane, 3-glycidoxypropyldialkylmonoalkoxysilane, 3-isocyanatopropyltrialkoxysilane, 3-isocyanatopropylalkyldialkoxysilane, 3-isocyanatopropyldialkylmonoalkoxysilane, 3-chloropropyltrialkoxysilane, 3-chloropropylalkyldialkoxysilane, and 3-chloropropyldialkylmonoalkoxysilane;
wherein EE is chosen from 2-ethylhexyl glycidyl ether, n-butyl glycidyl ether, t-butyl glycidyl ether, $C_3$-$C_{22}$ glycidyl ether, $C_3$-$C_{22}$ isocyanate, $C_3$-$C_{22}$ chloride, $C_3$-$C_{22}$ bromide, $C_3$-$C_{22}$ iodide, $C_3$-$C_{22}$ sulfate ester, $C_3$-$C_{22}$ phenolglycidyl ether, and any combination thereof;
$R^{3f}$ and $R^{5f}$ are independently chosen from H, alkyl, aminealkylamine, GG and EE; and
n1 is an integer from 2 to 6.

14. A method for reducing aluminosilicate containing scale in a Bayer process, comprising:
identifying a Bayer process equipment surface that is subject to scale formation during the Bayer process;
contacting the identified Bayer process equipment surface with an amount of a scale inhibiting composition effective to form a treated surface that is more resistant to scale formation upon subsequent contact with a Bayer process stream than an otherwise comparable untreated surface;
wherein the scale inhibiting composition comprises a liquor comprising an aqueous solution of one or more water-soluble salts having at least about 0.004 wt/wt % or more of total dissolved salts or a liquor having a pH of about 11.0 or greater, the scale inhibiting composition further comprising a silicon-containing compound having one or more —Si(OR)$_n$ groups;
wherein:
n is an integer from 1 to 3; and
R is H, optionally substituted $C_1$-$C_{20}$ alkyl, optionally substituted $C_6$-$C_{12}$ aryl, optionally substituted $C_7$-$C_{20}$ aralkyl, optionally substituted $C_2$-$C_{20}$ alkenyl, Group I metal ion, Group II metal ion, or $NR^1_4$; where each $R^1$ is independently chosen from H, optionally substituted $C_1$-$C_{20}$ alkyl, optionally substituted $C_6$-$C_{12}$ aryl, optionally substituted $C_7$-$C_{20}$ aralkyl, and optionally substituted $C_2$-$C_{20}$ alkenyl; and
contacting the treated surface with the Bayer process stream,
wherein the Bayer process stream comprises an amount of suspended solids in a range of about 0.01% to about 60% by weight, based on total weight of the Bayer process stream,
wherein the silicon-containing compound comprises at least three components, wherein a first component of the at least three components is according to general Formula X or XI—

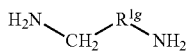
X

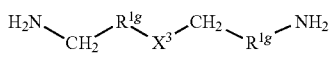
XI wherein $R^{1g}$ is independently CH$_2$, or, CH$_2$—CH$_2$; and $X^3$ is NH, NH—$R^{1g}$—NH, or NH—$R^{1g}$—NH—$R^{1g}$—NH,
a second component of the at least three components is 3-glycidoxypropyltrimethyloxysilane; and
a third component of the at least three components is 2-ethylhexylglycidyl ether;
wherein synthesis of the compound proceeds by combining the first component with the second component at a reactive hydrogen of the first component to form an intermediate, and then reacting the intermediate with the third component to form the compound.

15. A method for reducing aluminosilicate containing scale in a Bayer process, comprising:
identifying a Bayer process equipment surface that is subject to scale formation during the Bayer process;
contacting the identified Bayer process equipment surface with an amount of a scale inhibiting composition effective to form a treated surface that is more resistant to scale formation upon subsequent contact with a Bayer process stream than an otherwise comparable untreated surface;
wherein the scale inhibiting composition comprises a liquor comprising an aqueous solution of one or more water-soluble salts having at least about 0.004 wt/wt % or more of total dissolved salts or a liquor having a pH of about 11.0 or greater, the scale inhibiting composition further comprising a silicon-containing compound having one or more —Si(OR)$_n$ groups;
wherein:
n is an integer from 1 to 3; and
R is H, optionally substituted $C_1$-$C_{20}$ alkyl, optionally substituted $C_6$-$C_{12}$ aryl, optionally substituted $C_7$-$C_{20}$ aralkyl, optionally substituted $C_2$-$C_{20}$ alkenyl, Group I metal ion, Group II metal ion, or $NR^1_4$; where each $R^1$ is independently chosen from H, optionally substituted $C_1$-$C_{20}$ alkyl, optionally substituted $C_6$-$C_{12}$ aryl, optionally substituted $C_7$-$C_{20}$ aralkyl, and optionally substituted $C_2$-$C_{20}$ alkenyl; and contacting the treated surface with the Bayer process stream, wherein the Bayer process stream comprises an amount of suspended solids in a range of about 0.01% to about 60% by weight, based on total weight of the Bayer process stream, wherein the silicon-containing compound is a polymer having pendant thereto a group or end group according to Formula XII—

(XII)

wherein v is an integer of either 1 or 2; v+w=3; $R^{1b}$ is chosen from H, $C_1$-$C_{12}$ alkyl, aryl, Na, K, Li, and $NH_4$; and J is chosen from H and a hydrocarbon group having a number of carbons from 1 to 20.

16. A method for reducing aluminosilicate containing scale in a Bayer process, comprising:

identifying a Bayer process equipment surface that is subject to scale formation during the Bayer process;

contacting the identified Bayer process equipment surface with an amount of a scale inhibiting composition effective to form a treated surface that is more resistant to scale formation upon subsequent contact with a Bayer process stream than an otherwise comparable untreated surface;

wherein the scale inhibiting composition comprises a liquor comprising an aqueous solution of one or more water-soluble salts having at least about 0.004 wt/wt % or more of total dissolved salts or a liquor having a pH of about 11.0 or greater, the scale inhibiting composition further comprising a silicon-containing compound having one or more —Si(OR)$_n$ groups;

wherein:

n is an integer from 1 to 3; and

R is H, optionally substituted $C_1$-$C_{20}$ alkyl, optionally substituted $C_6$-$C_{12}$ aryl, optionally substituted $C_7$-$C_{20}$ aralkyl, optionally substituted $C_2$-$C_{20}$ alkenyl, Group I metal ion, Group II metal ion, or $NR^1_4$; where each $R^1$ is independently chosen from H, optionally substituted $C_1$-$C_{20}$ alkyl, optionally substituted $C_6$-$C_{12}$ aryl, optionally substituted $C_7$-$C_{20}$ aralkyl, and optionally substituted $C_2$-$C_{20}$ alkenyl; and contacting the treated surface with the Bayer process stream, wherein the Bayer process stream comprises an amount of suspended solids in a range of about 0.01% to about 60% by weight, based on total weight of the Bayer process stream, wherein the silicon-containing compound is a polymer that comprises a unit of Formula XIII and a unit of Formula XIV—

(XIII)

(XIV)

wherein:

$A^{1b}$ and $A^{2b}$ are each independently a hydrocarbon group having from 1 to 20 carbons or $A^{1b}$ and $A^{2b}$ are each independently a direct bond between the nitrogen atom and the adjoining group;

$T^2$ and $E^2$ are each independently hydrocarbon group having from 2 to 40 carbons; and $Q^2$ is chosen from H and a hydrocarbon group having from 1 to 20 carbons, wherein the molecular weight of the polymer is at least 500, and $Q^2$ does not contain a silane group.

* * * * *